(12) United States Patent
Tashiro

(10) Patent No.: US 8,228,614 B2
(45) Date of Patent: Jul. 24, 2012

(54) ZOOM LENS AND IMAGE PICKUP APPARATUS HAVING THE ZOOM LENS

(75) Inventor: Yoshihisa Tashiro, Nikko (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 13/006,294

(22) Filed: Jan. 13, 2011

(65) Prior Publication Data

US 2011/0176223 A1 Jul. 21, 2011

(30) Foreign Application Priority Data

Jan. 21, 2010 (JP) .................................. 2010-010929

(51) Int. Cl.
*G02B 15/14* (2006.01)
(52) U.S. Cl. ......................... 359/683; 359/676; 359/686
(58) Field of Classification Search .......... 359/680–683, 359/676, 686, 689
See application file for complete search history.

(56) References Cited

U.S. PATENT DOCUMENTS

| | | | |
|---|---|---|---|
| 6,115,188 A * | 9/2000 | Nishio et al. | 359/690 |
| 7,292,398 B1 * | 11/2007 | Misaka | 359/781 |
| 7,304,805 B2 | 12/2007 | Endo et al. | |
| 7,505,214 B2 | 3/2009 | Hamano et al. | |
| 7,643,228 B2 | 1/2010 | Ishibashi | |

* cited by examiner

*Primary Examiner* — James Greece
(74) *Attorney, Agent, or Firm* — Canon U.S.A., Inc. IP Division

(57) ABSTRACT

A zoom lens includes, in order from an object side to an image side, a first lens unit having a positive refractive power, a second lens unit having a negative refractive power, and a subsequent lens unit including at least two lens units. An interval between respective adjacent lens units varies for zooming. The first lens unit includes a positive lens and a negative lens. A deviation, from a standard line, of a material of a negative lens GLn, whose relative partial dispersion of a material ($\theta gF$) is the lowest of relative partial dispersions of materials of other lenses included in the first lens unit ($\Delta\theta gF1n$), an Abbe number of the material of the negative lens GLn ($v1n$), a focal length of the negative lens GLn ($f1n$), a deviation, from a standard line, of a material of a positive lens GNLp, whose relative partial dispersion of a material ($\theta gF$) is the highest of relative partial dispersions of materials of other lenses included in the first lens unit ($\Delta\theta gF1p$), an Abbe number of the material of the positive lens GNLp ($v1p$), a focal length of the positive lens GNLp ($f1p$), and a focal length of the entire zoom lens system at a telephoto end ($ft$) are appropriately set.

11 Claims, 21 Drawing Sheets

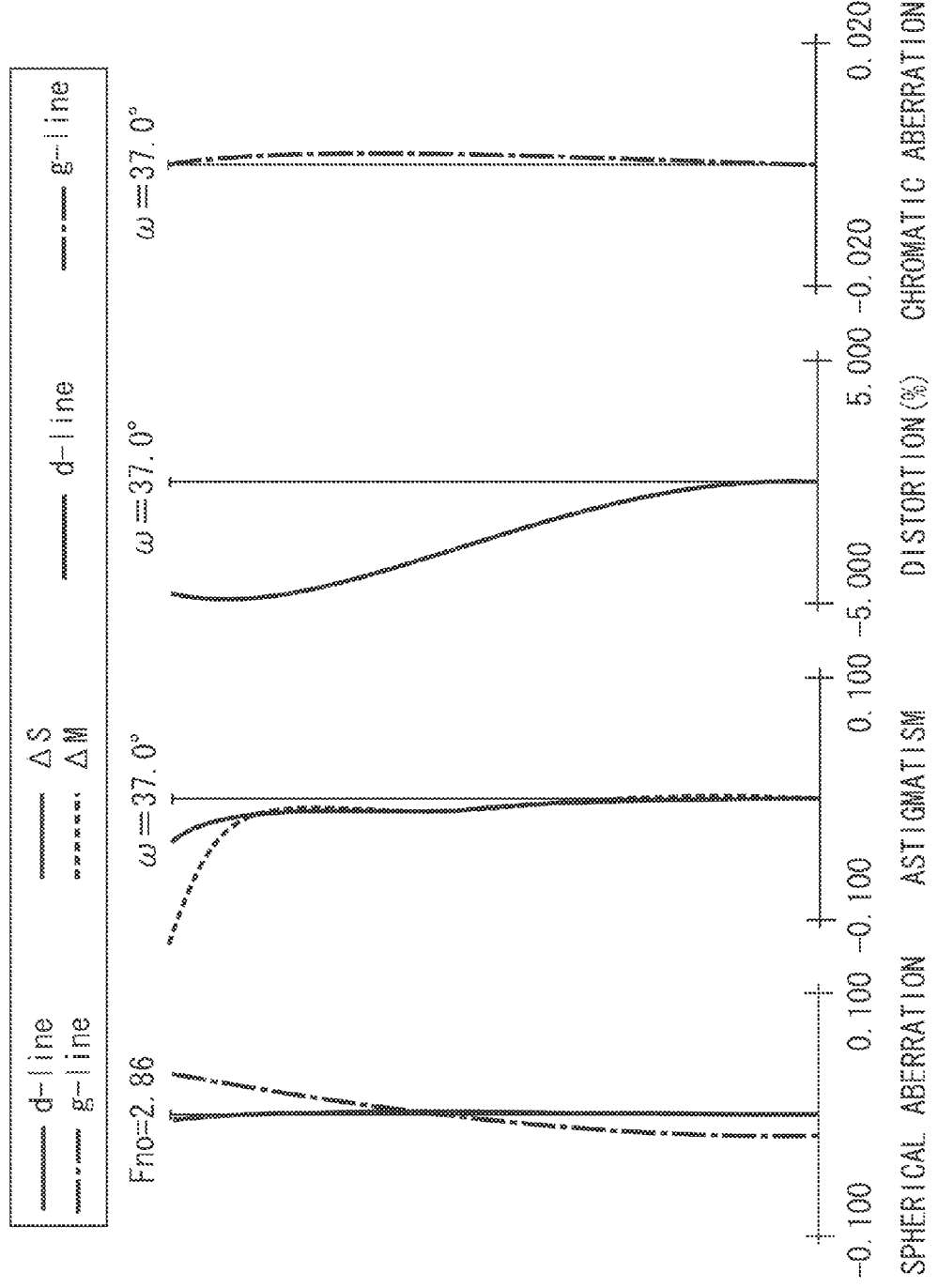

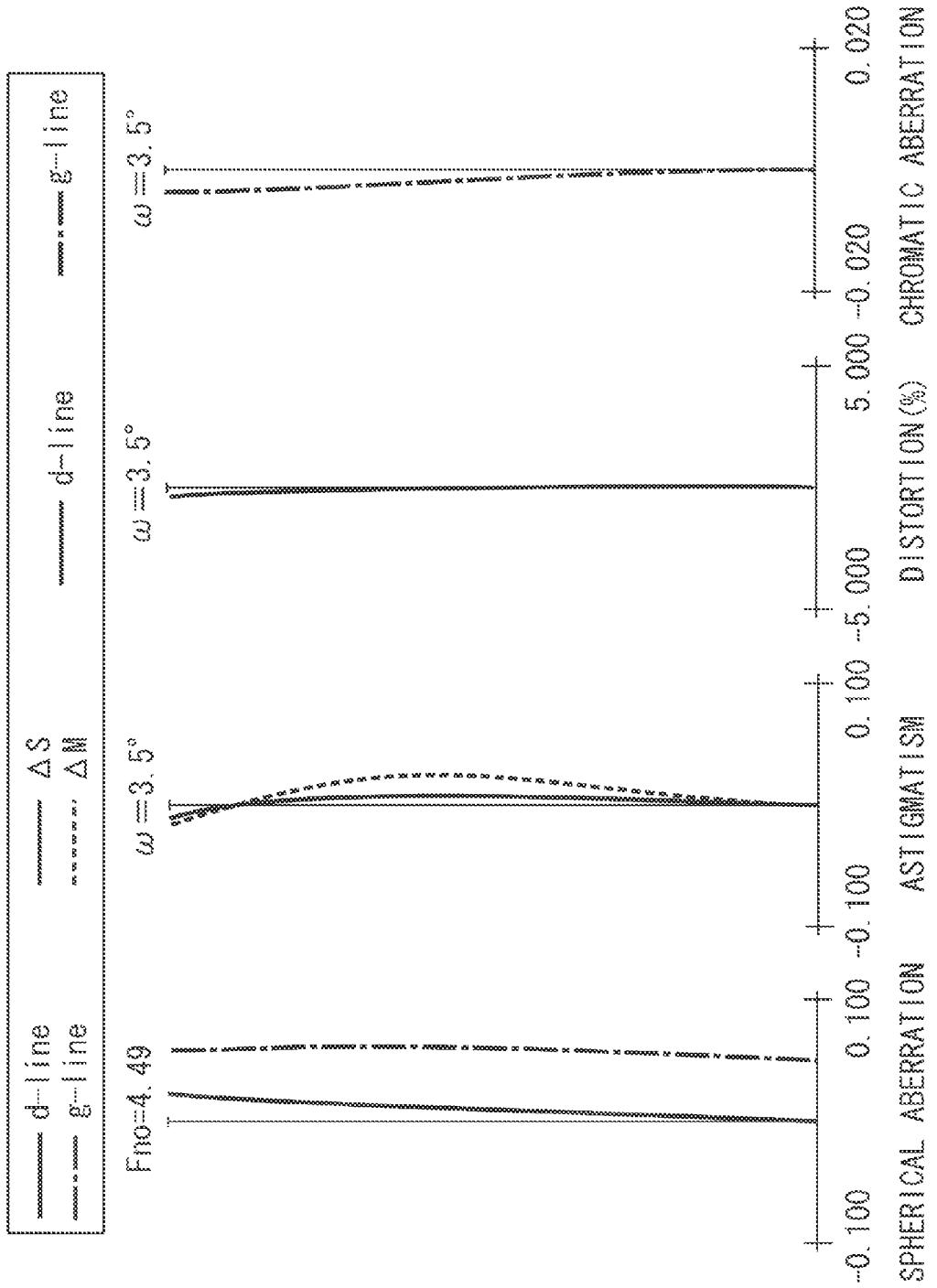

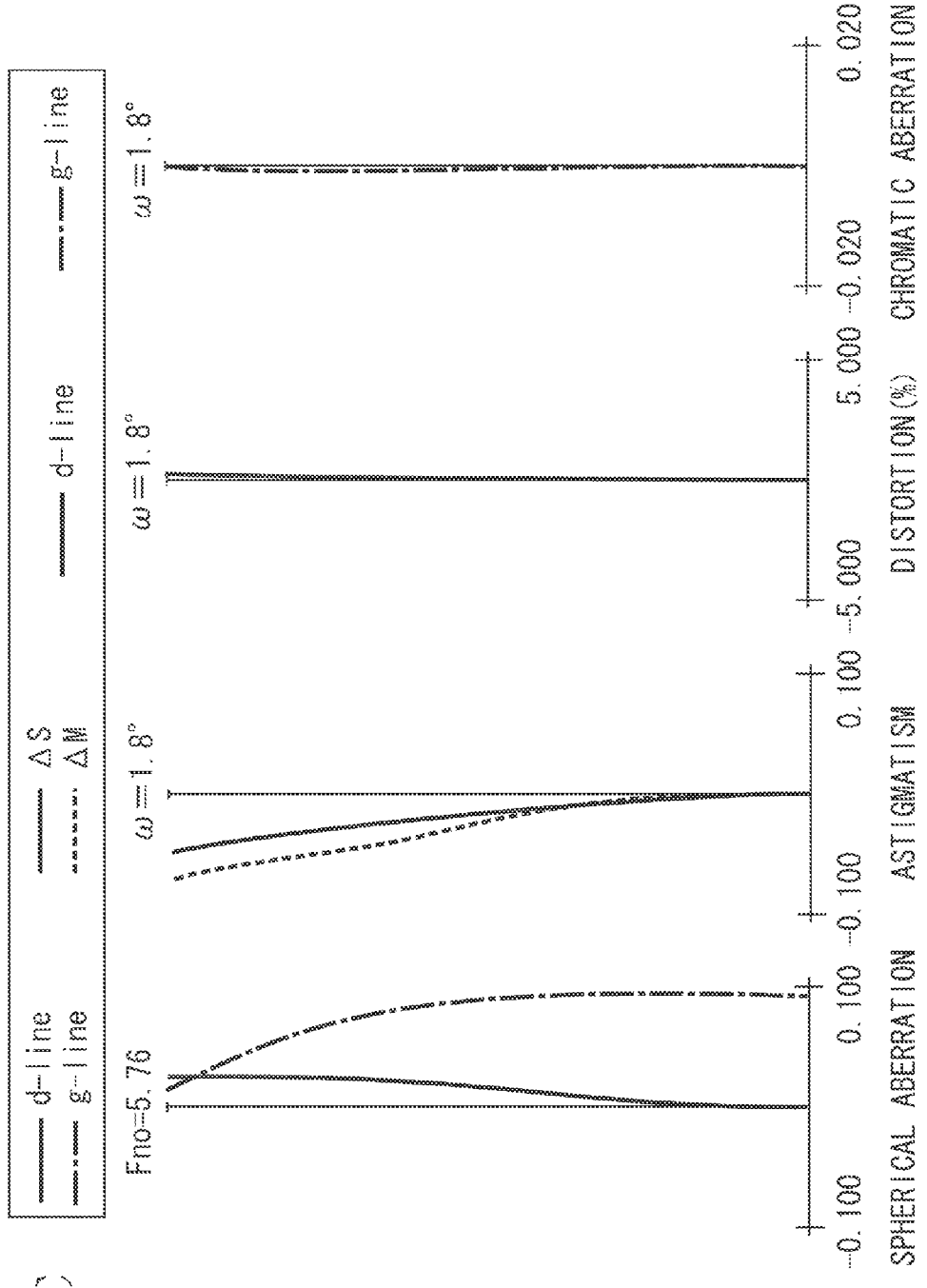

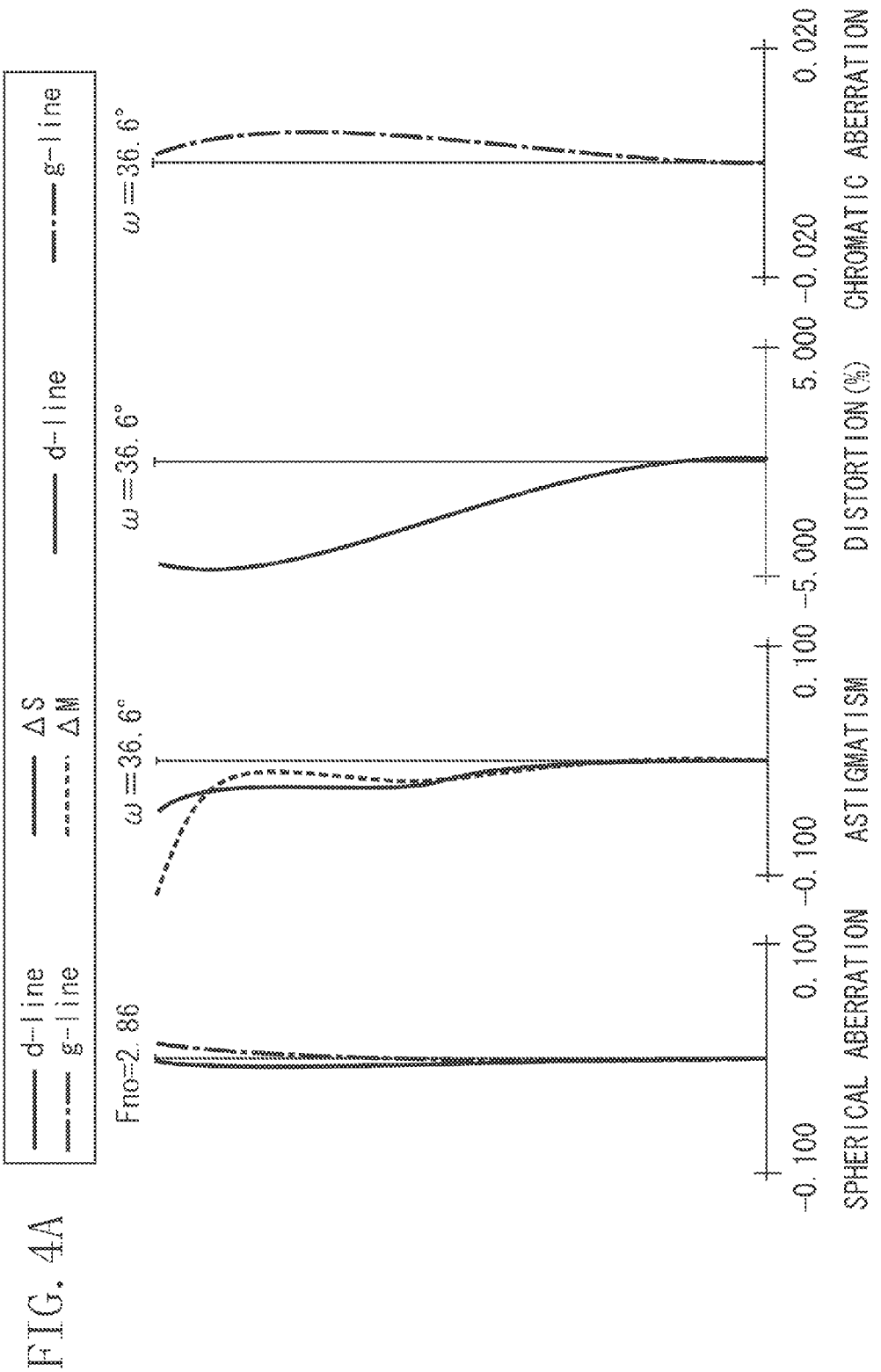

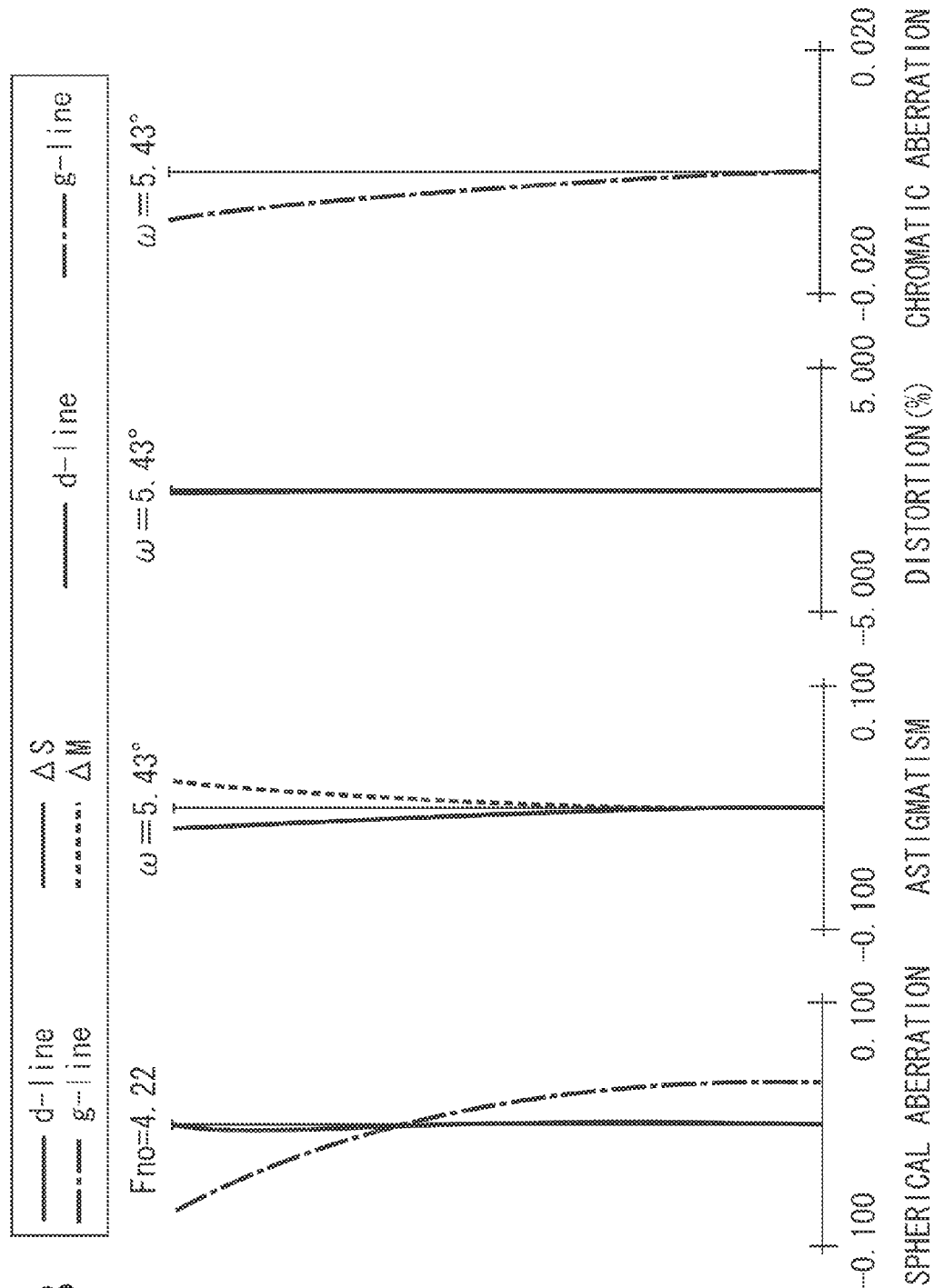

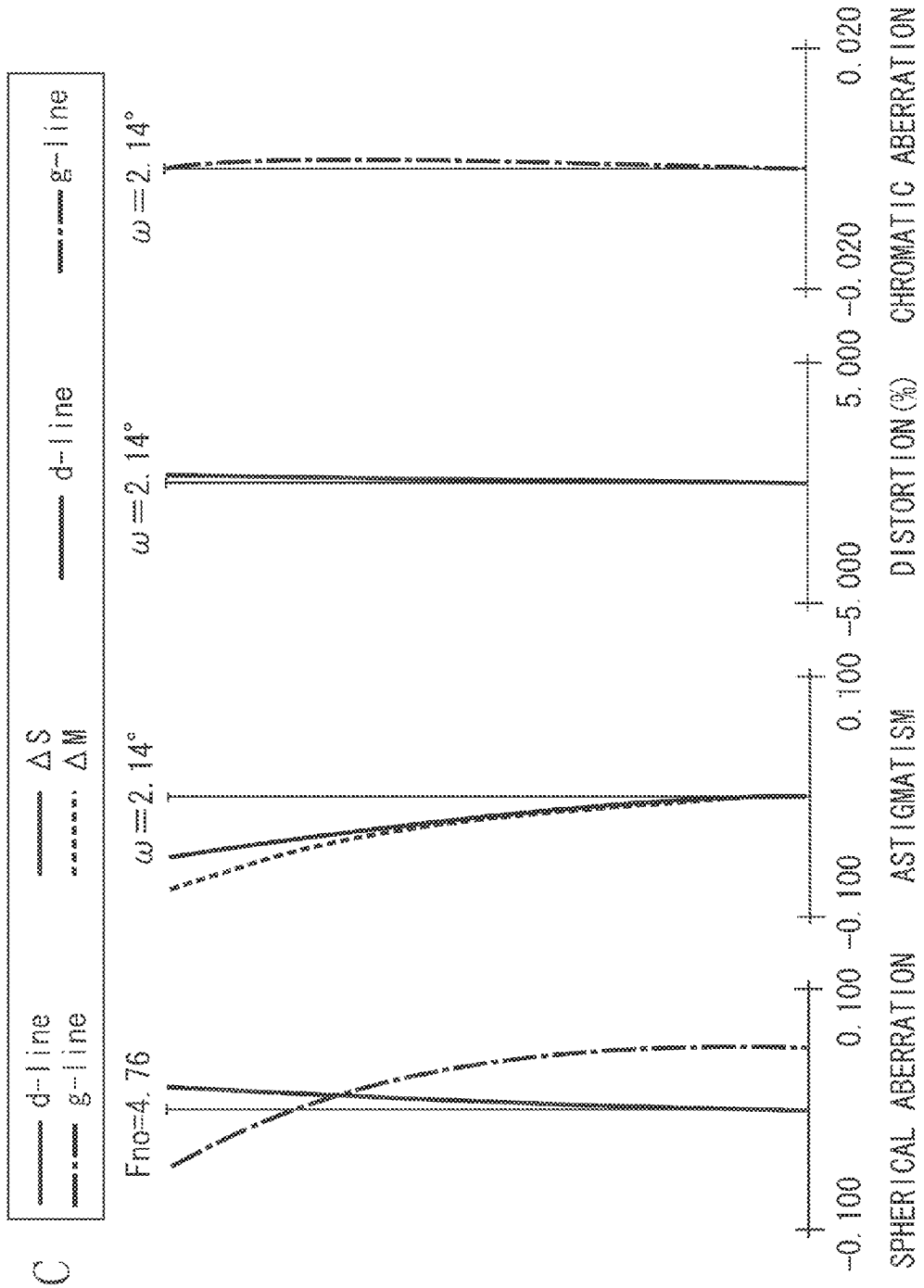

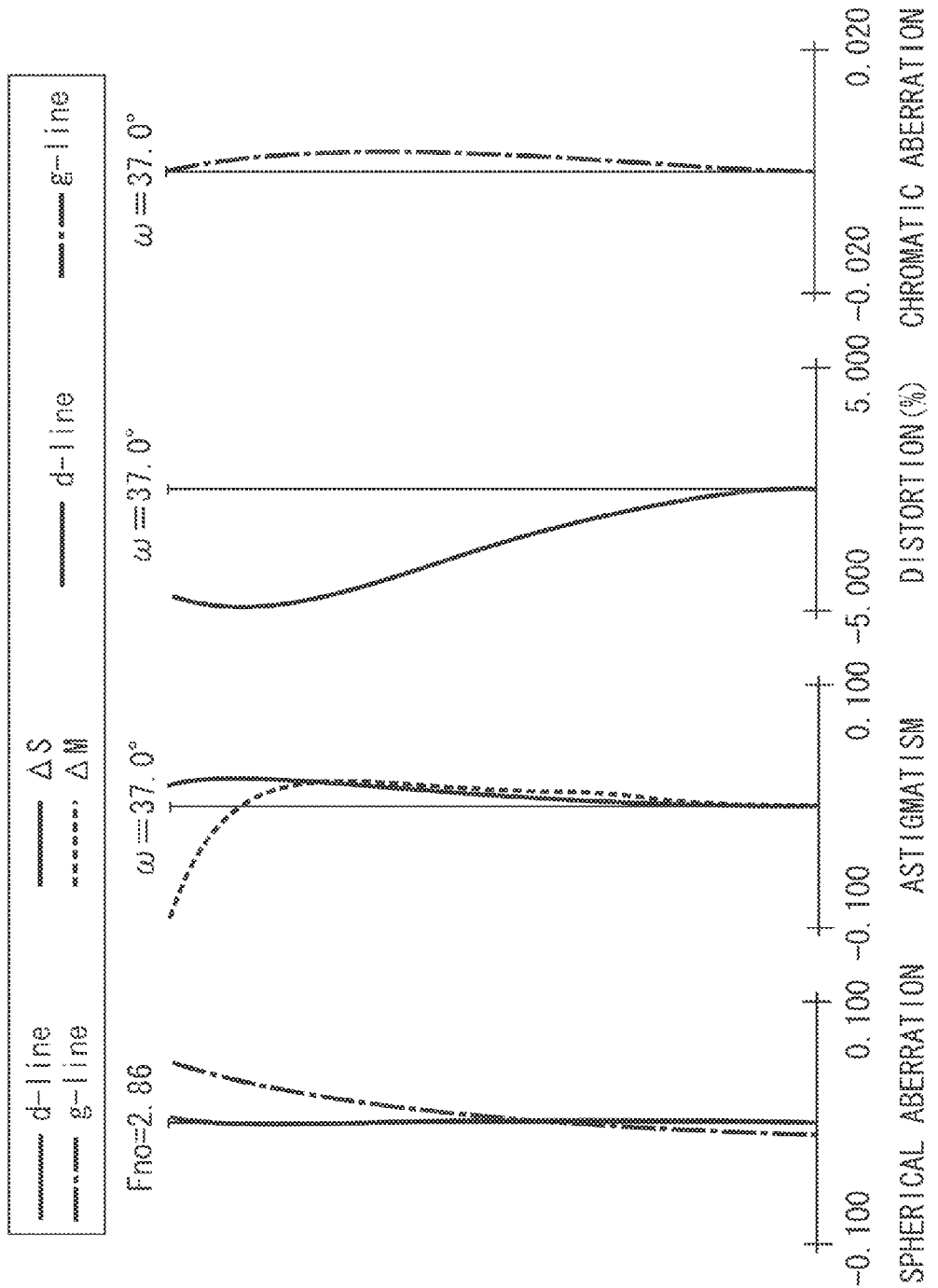

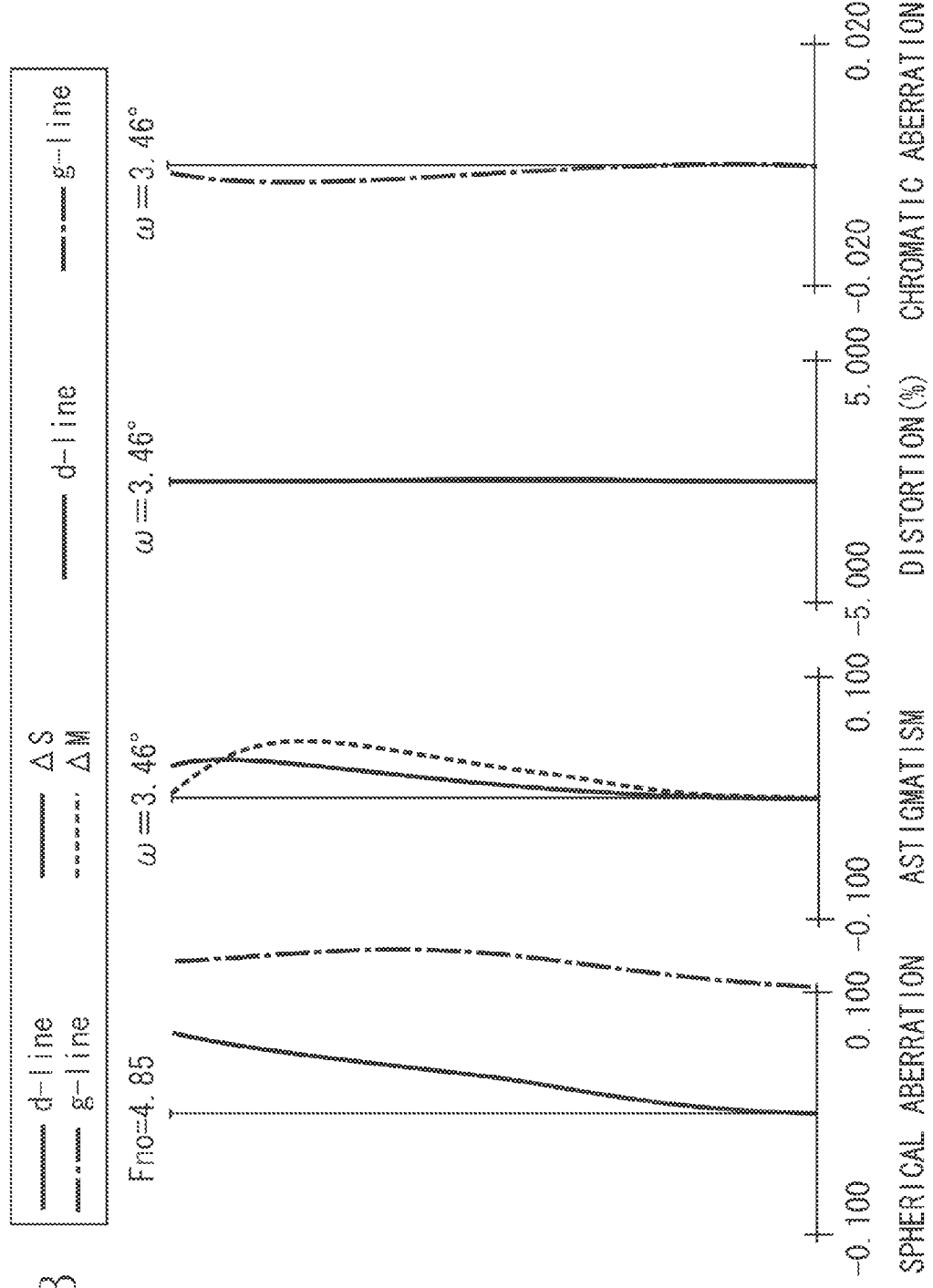

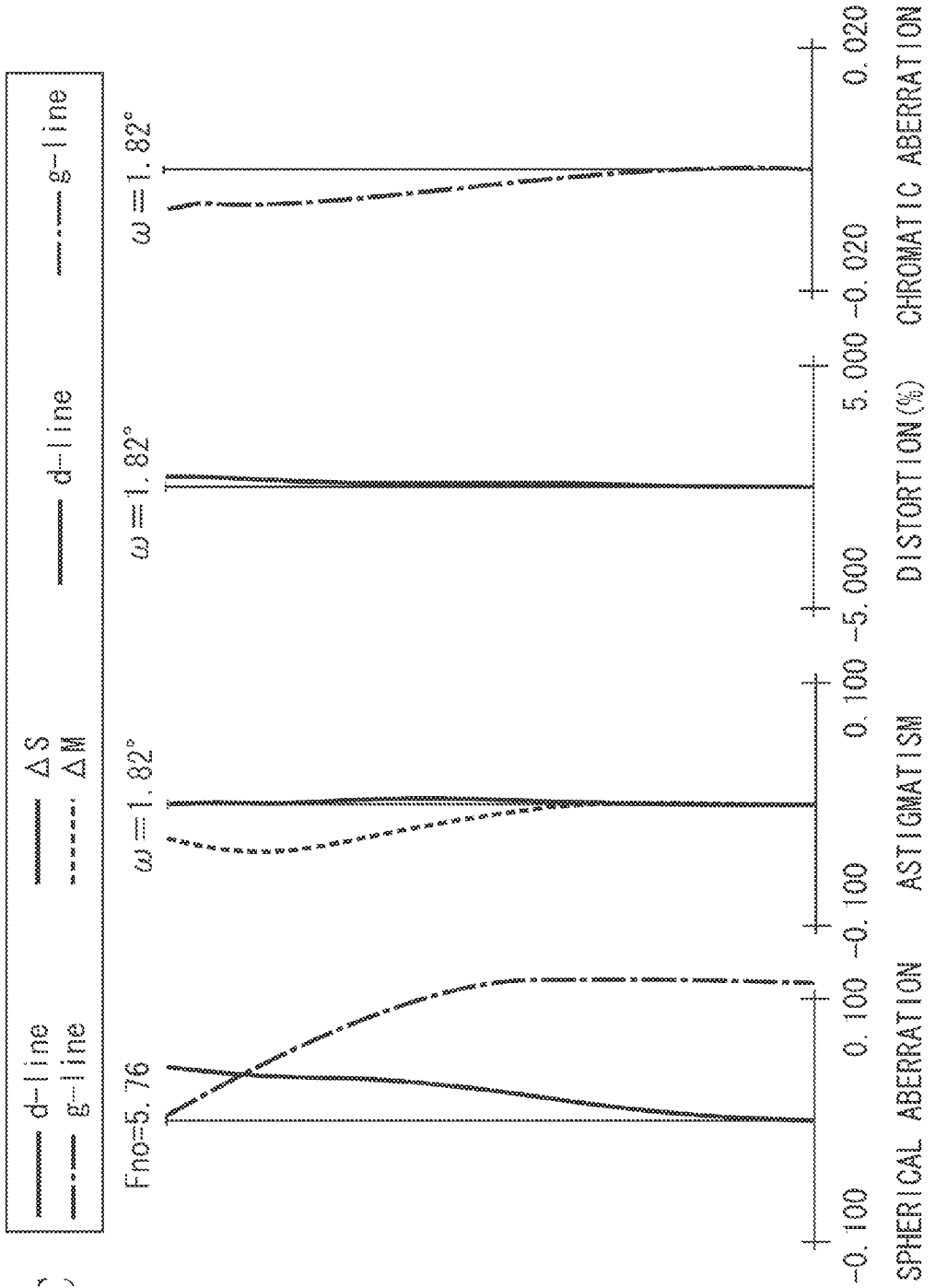

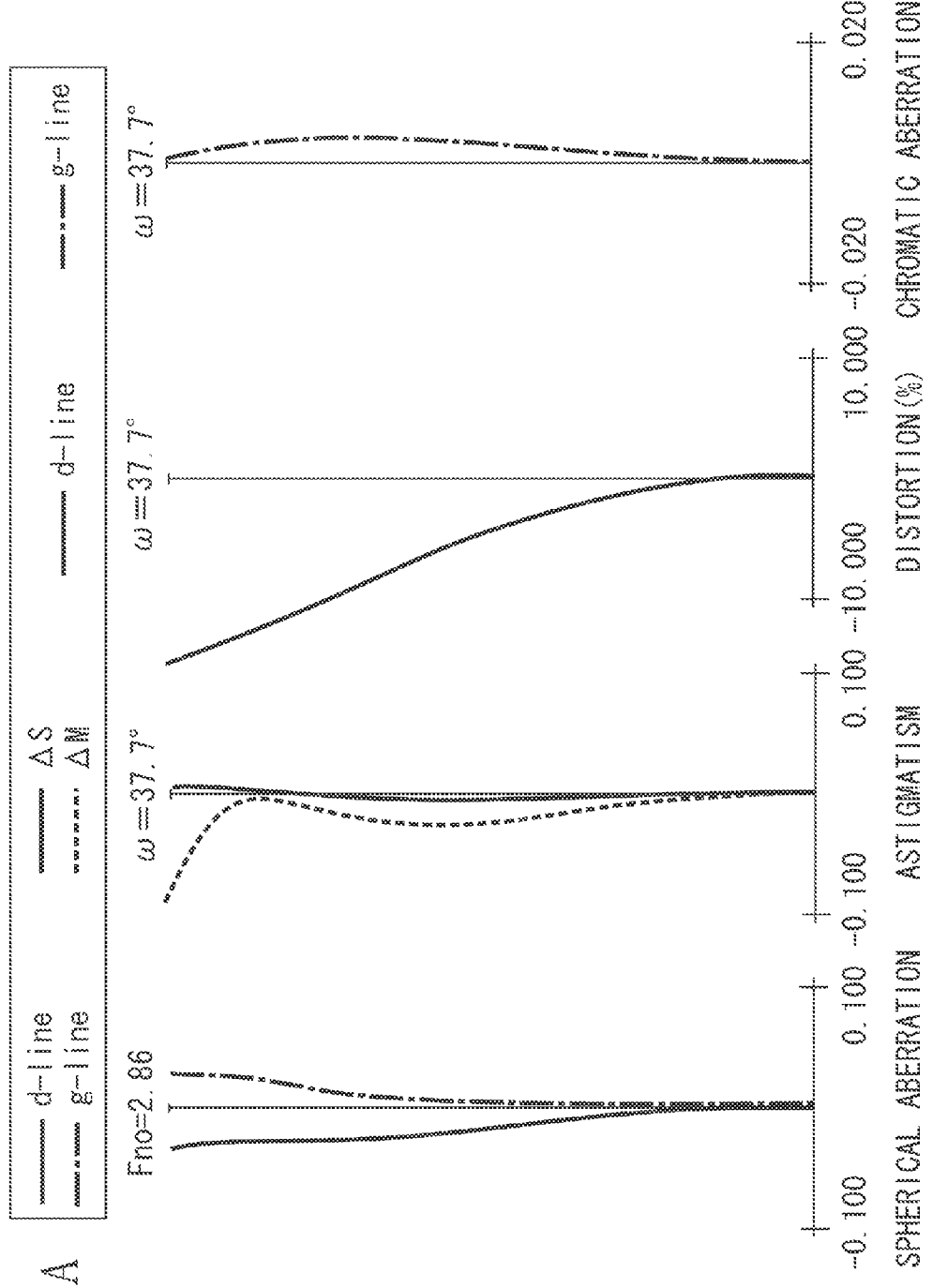

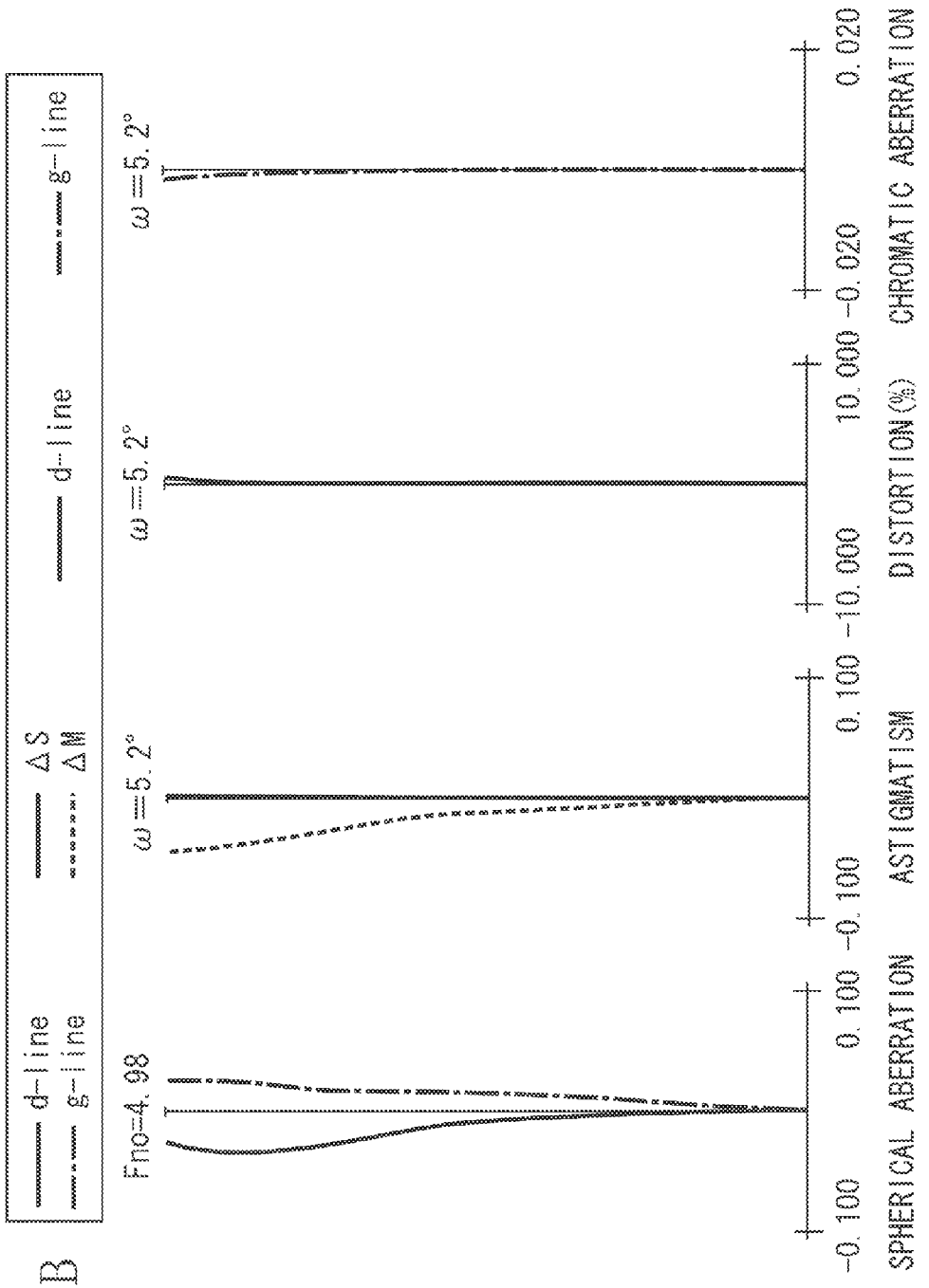

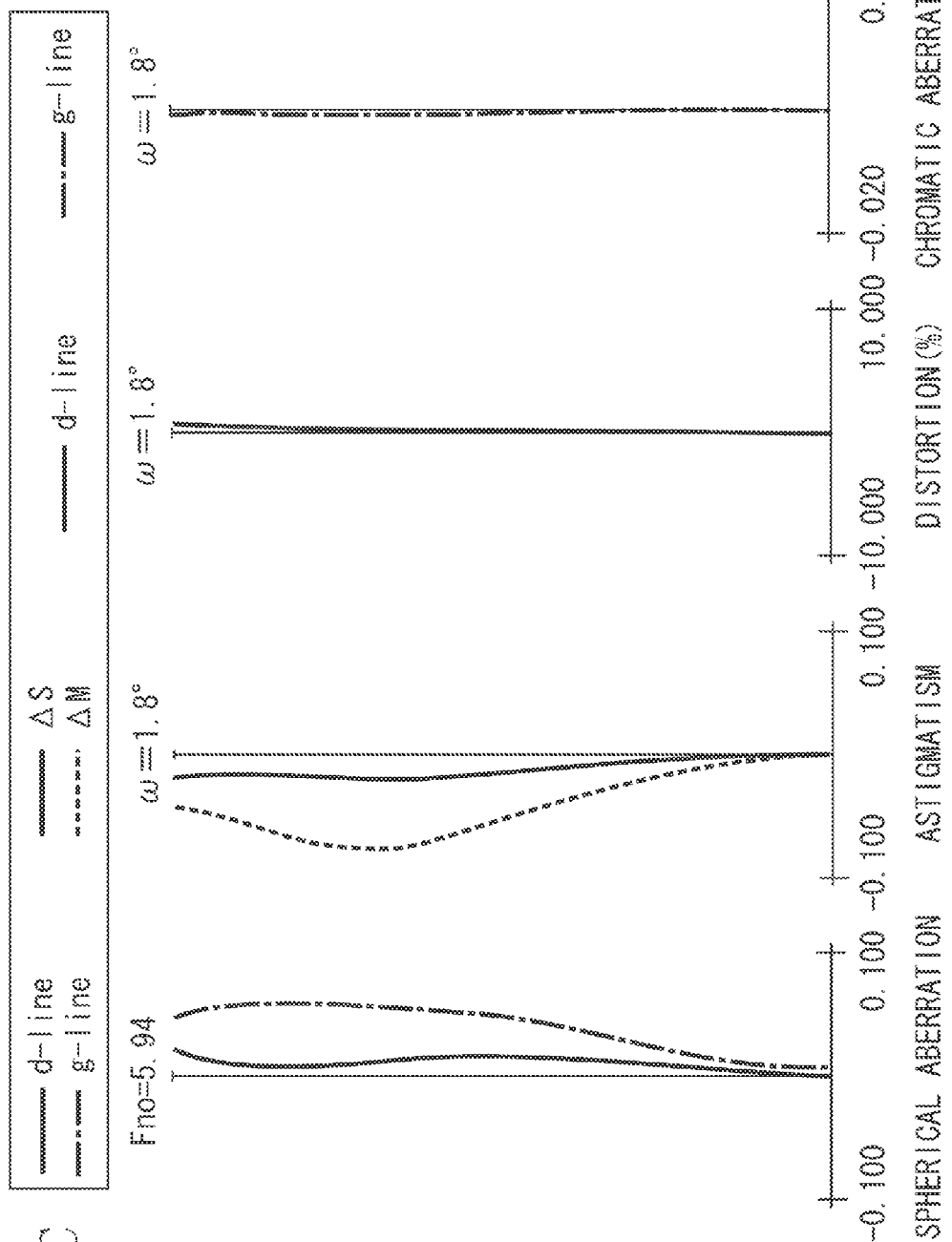

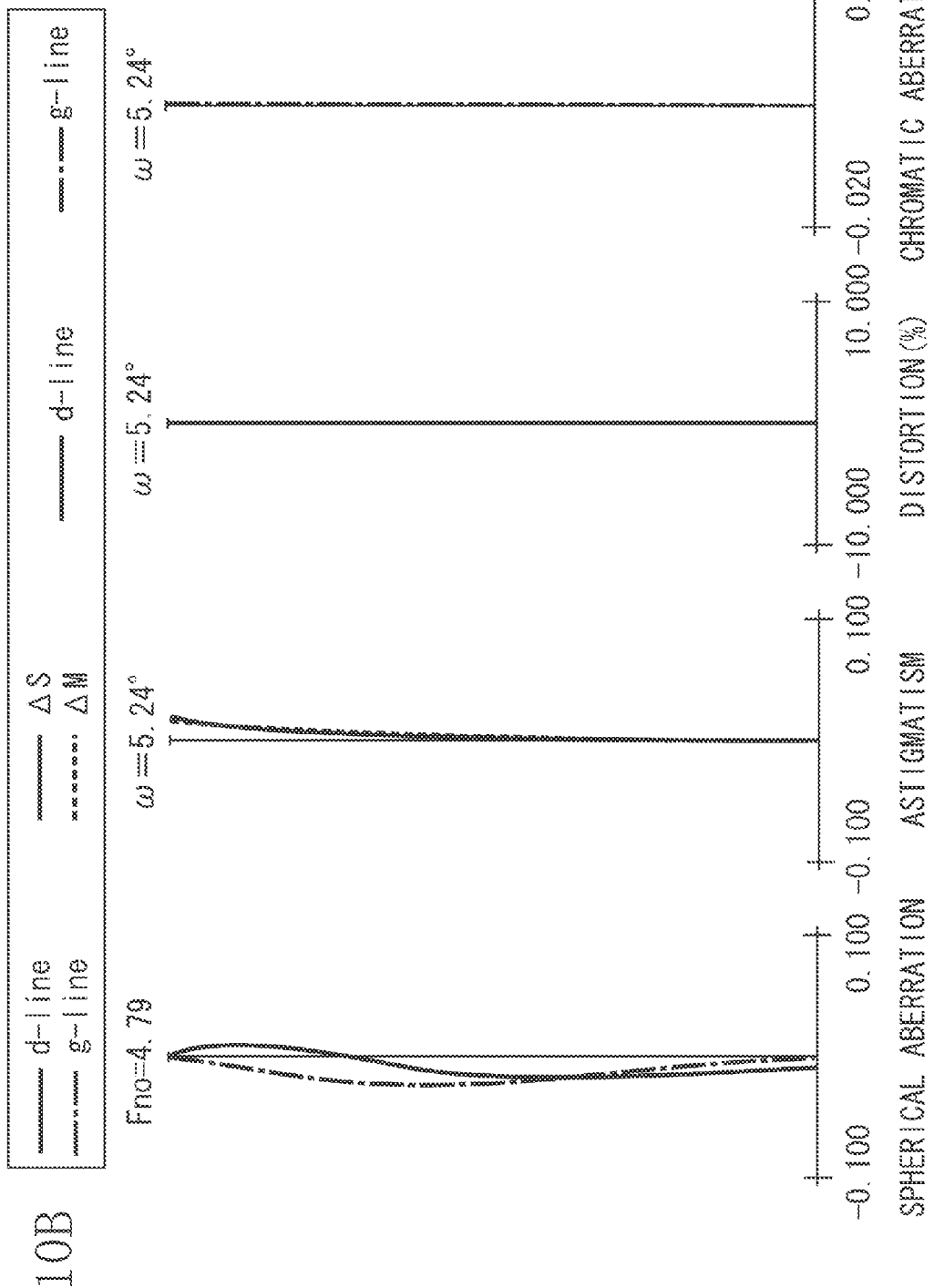

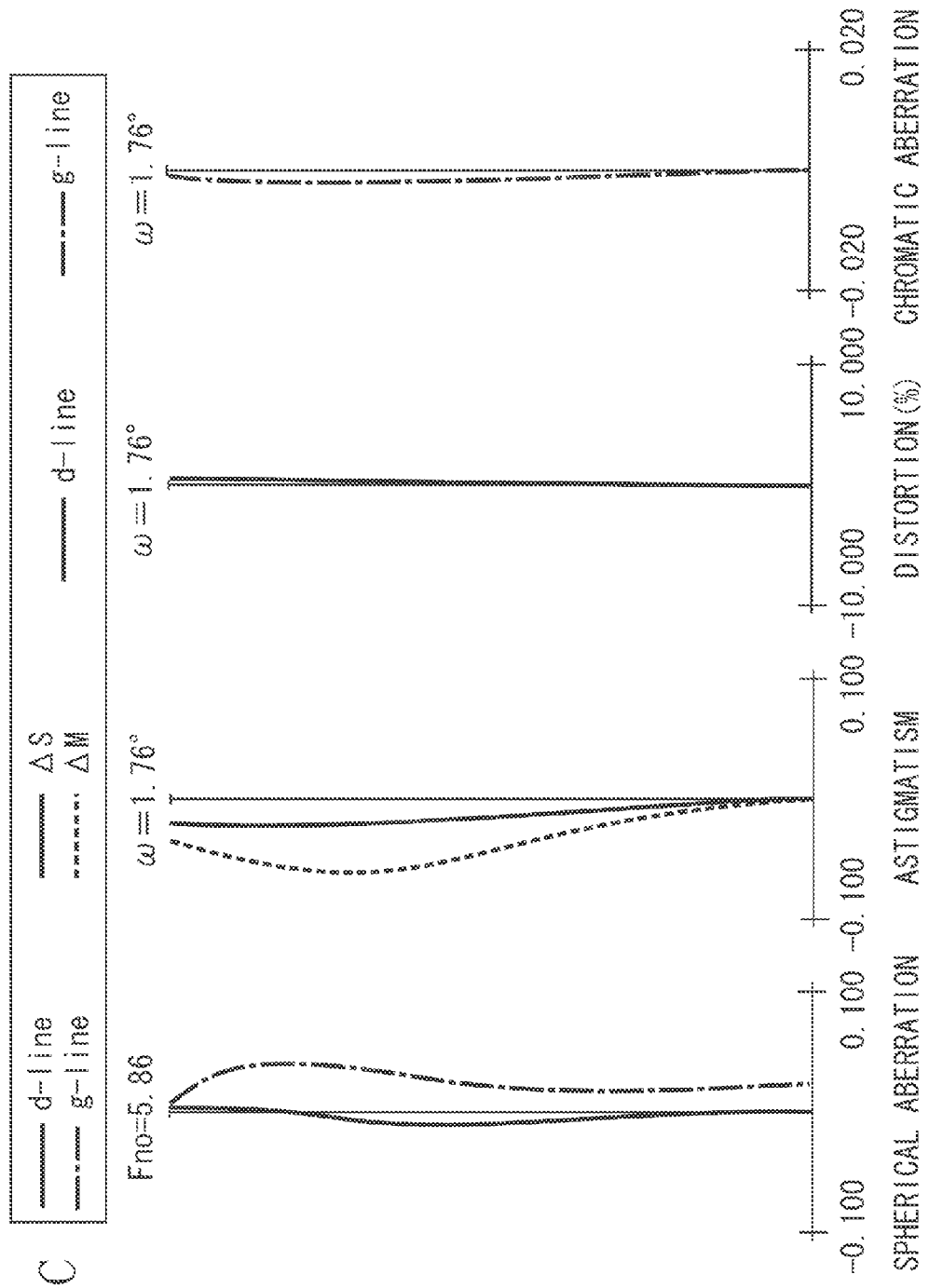

ZOOM LENS AND IMAGE PICKUP APPARATUS HAVING THE ZOOM LENS

BACKGROUND OF THE INVENTION

1. Field of the Invention

The present invention relates to a zoom lens. More specifically, the present invention relates to a zoom lens useful as a photographic optical system for an image pickup apparatus, such as a digital camera, a video camera, a television (TV) camera, or a silver-halide film camera.

2. Description of the Related Art

Continuous improvement on CCD (charge coupled device) or CMOS (complementary metal oxide semiconductor) image sensors used in image pickup apparatuses, such as a digital camera or a video camera, has yielded image sensors with an ever larger number of pixels. Accordingly, market forces dictate that an image pickup apparatus that includes such an improved image sensor should use an equally improved photographic lens. Specifically, it is desired a high-resolution zoom lens whose chromatic aberration has been sufficiently corrected to prevent color bleed on an image when a white light source is used as well as monochromatic aberrations, such as spherical aberration and coma, have been sufficiently corrected.

In addition, in order to enlarge the shooting area, it is also desired that a photographic lens used in the above-described image pickup apparatus should have a high zoom ratio. In particular, for a telephotographic type zoom lens, which has a high zoom ratio and a long back focus at the telephoto end, both primary achromatization and the correction of secondary spectrum should be appropriately executed for correcting chromatic aberration in order to increase the resolution.

As a zoom lens having a high zoom ratio, a positive-lead type zoom lens has been widely used. The positive-lead type zoom lens includes, in order from the object side to the image side, a first lens unit having a positive refractive power, a second lens unit having a negative refractive power, and a subsequent lens unit including one or more lens units and having an overall positive refractive power.

A zoom lens of the positive-lead type is known and has been conventionally used. One type of the positive-lead type zoom lens uses an anomalous partial dispersion material having a high dispersion as a material of a lens included in the first lens unit in order to appropriately correct chromatic aberration. More specifically, as the positive-lead type zoom lens described above, a four-unit zoom lens has been conventionally used, which includes, in order from the object side to the image side, positive, negative, positive, and positive lens units, in which the first lens unit is made of a low-dispersion material having an anomalous partial dispersion.

U.S. Pat. No. 7,505,214 and U.S. Pat. No. 7,643,228 each discuss a zoom lens whose first lens unit is made of a high-dispersion optical material having an anomalous partial dispersion to appropriately correct chromatic aberration at the telephoto end. The zoom lens discussed in each of U.S. Pat. No. 7,505,214 and U.S. Pat. No. 7,643,228 corrects chromatic aberration of the entire zoom lens system over the entire zoom area by suppressing the secondary spectrum that may occur in the first lens unit. In addition, U.S. Pat. No. 7,304,805 discusses a five-unit zoom lens including, in order from the object side to the image side, positive, negative, positive, negative, and positive lens units, which is capable of correcting chromatic aberration at the telephoto end with the first lens unit made of a high-dispersion material having an anomalous partial dispersion.

If the positive-lead type zoom lens described above is used, it becomes relatively easy to achieve a high zoom ratio on a zoom lens system whose total size is small. However, if the zoom ratio is simply increased in the positive-lead type zoom lens, chromatic aberration may greatly vary. In addition, in this case, a large amount of secondary spectrum of axial chromatic aberration may occur in the zoom area at the telephoto end.

In the four-unit or five-unit zoom lens described above, the height of incident light may become high in the first lens unit in the telephotographic area. In other words, axial chromatic aberration may arise primarily in the first lens unit. In order to suppress chromatic aberration and the secondary spectrum thereof occurring in this case, it is necessary to correct chromatic aberration and the secondary spectrum with the first lens unit, in which the height of a paraxial ray becomes high at the telephoto end.

In the zoom lens discussed in each of U.S. Pat. No. 7,505,214 and U.S. Pat. No. 7,643,228, a lens made of a high dispersion material is used in the first lens unit having a positive refractive power. Accordingly, it is necessary that the material of the negative lens included in the first lens unit thereof has a dispersion higher than the dispersion of the lens used in the first lens unit having a positive refractive power in order to achieve primary achromatism more intensely by the negative lens than by the positive lens.

In addition, in the above-described conventional zoom lens, it is necessary to assign a high negative refractive power to the negative lens to execute effective primary achromatism. Therefore, it is necessary for the above-described conventional zoom lens to use a material having a high refractive index as a material of the negative lens to correct spherical aberration and coma that may occur in the first lens unit at the telephoto end.

Thus, in the positive-lead type zoom lens, in order to suppress chromatic aberration that may occur when the zoom ratio is increased and to achieve a high optical performance for the entire zoom area, it is significant to appropriately set the lens configuration of the first lens unit having a positive refractive power. In addition, in order to suppress variation of various aberrations, such as chromatic aberration that may occur during zooming, it is also significant to appropriately set the lens configuration of the second lens unit.

SUMMARY OF THE INVENTION

The present invention is directed to a positive-lead type zoom lens capable of effectively correcting chromatic aberration at the telephoto end and of achieving a high optical performance for the entire zoom area.

According to an aspect of the present invention, a zoom lens includes, in order from an object side to an image side, a first lens unit having a positive refractive power, a second lens unit having a negative refractive power, and a subsequent lens unit including at least two lens units. In the zoom lens, an interval between respective adjacent lens units varies for zooming. The first lens unit includes a positive lens and a negative lens. In the zoom lens, a deviation from a standard line, of a material of a negative lens GLn whose relative partial dispersion of a material ($\theta gF$) is the lowest of relative partial dispersions of materials of other lenses included in the first lens unit ($\Delta\theta gF1n$), an Abbe number of the material of the negative lens GLn ($v1n$), a focal length of the negative lens GLn ($f1n$), a deviation from a standard line, of a material of a positive lens GNLp whose relative partial dispersion of a material ($\theta gF$) is the highest of relative partial dispersions of materials of other lenses included in the first lens unit ($\Delta\theta gF1p$), an Abbe number of the material of the positive lens GNLp ($v1p$), a focal length of the positive lens GNLp ($f1p$), and a focal length of the entire zoom lens at a telephoto end (ft) satisfy the following conditions:

$$-4.5<(ft/f1n)\times(\Delta\theta gF1n/v1n)\times10^4<6.0$$

$$5.0<v1n<27.0$$

$$5.5<(ft/f1p)\times(\Delta\theta gF1p/v1p)\times10^4<25.0.$$

Further features and aspects of the present invention will become apparent to persons of ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIGS. 2A, 2B, and 2C are aberration charts of the zoom lens according to the first exemplary embodiment at the wide-angle end, at the middle focal length, and at the telephoto end, respectively.

FIGS. 4A, 4B, and 4C are aberration charts of the zoom lens according to the second exemplary embodiment at the wide-angle end, at the middle focal length, and at the telephoto end, respectively.

FIGS. 6A, 6B, and 6C are aberration charts of the zoom lens according to the third exemplary embodiment at the wide-angle end, at the middle focal length, and at the telephoto end, respectively.

FIGS. 8A, 8B, and 8C are aberration charts of the zoom lens according to the fourth exemplary embodiment at the wide-angle end, at the middle focal length, and at the telephoto end, respectively.

FIGS. 10A, 10B, and 10C are aberration charts of the zoom lens according to the fifth exemplary embodiment at the wide-angle end, at the middle focal length, and at the telephoto end, respectively.

DESCRIPTION OF THE EMBODIMENTS

Figure 1:
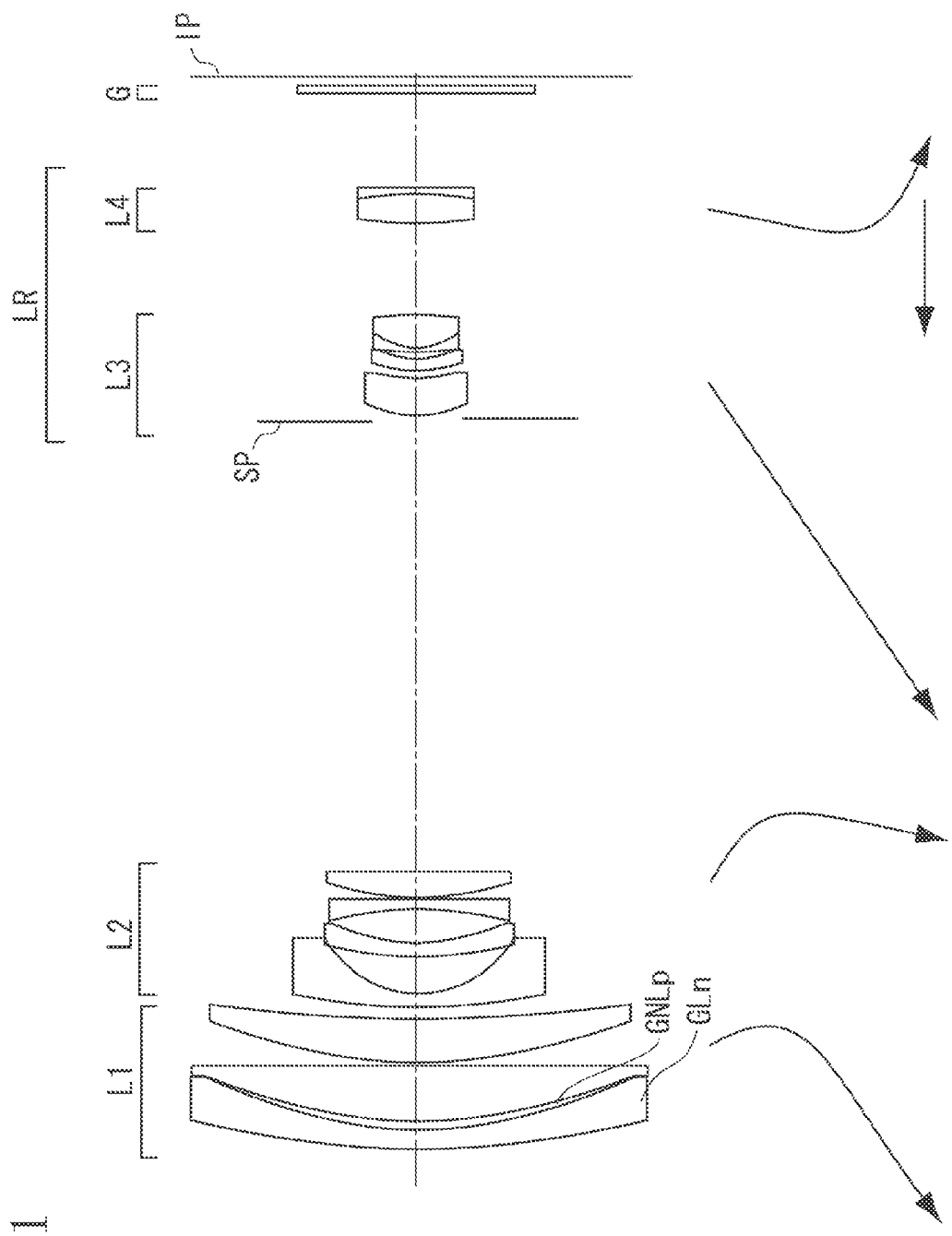
FIG. 1 is a lens cross section of a zoom lens according to a first exemplary embodiment of the present invention at the wide-angle end.

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise in the claims.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item has been defined in one figure, it may not be discussed for following figures, so as to avoid unnecessary duplication.

Note that herein when referring to correcting or corrections of an error (e.g., aberration), a reduction of the error and/or a correction of the error is intended. In addition, as used herein, the side of a lens where an object to be imaged is located is referred to as the "object side" or front side of the lens; and the side of the lens where the image of the object is formed is referred to as the "image side" or back side of the lens.

A zoom lens according to an exemplary embodiment of the present invention includes, in order from the object side to the image side, a first lens unit having a positive refractive power, a second lens unit having a negative refractive power, and a subsequent lens unit including at least two lens units. During zooming, the interval between respective adjacent lens units varies.

The subsequent lens unit includes, in order from the object side to the image side, a third lens unit having a positive refractive power and a fourth lens unit having a positive refractive power. Alternatively, the subsequent lens unit includes, in order from the object side to the image side, a third lens unit having a positive refractive power, a fourth lens unit having a negative refractive power, and a fifth lens unit having a positive refractive power. In each exemplary embodiment of the present invention, a lens unit having a refractive power can be located at a position on at least one of the object side of the first lens unit or the image side of the last lens unit.

FIG. 1 is a lens cross section of a zoom lens according to a first exemplary embodiment of the present invention at the wide-angle end (short focal length end). FIGS. 2A through 2C are aberration charts of the zoom lens according to the first exemplary embodiment at the wide-angle end, at the middle focal length, and at the telephoto end (long focal length end), respectively.

Figure 3:
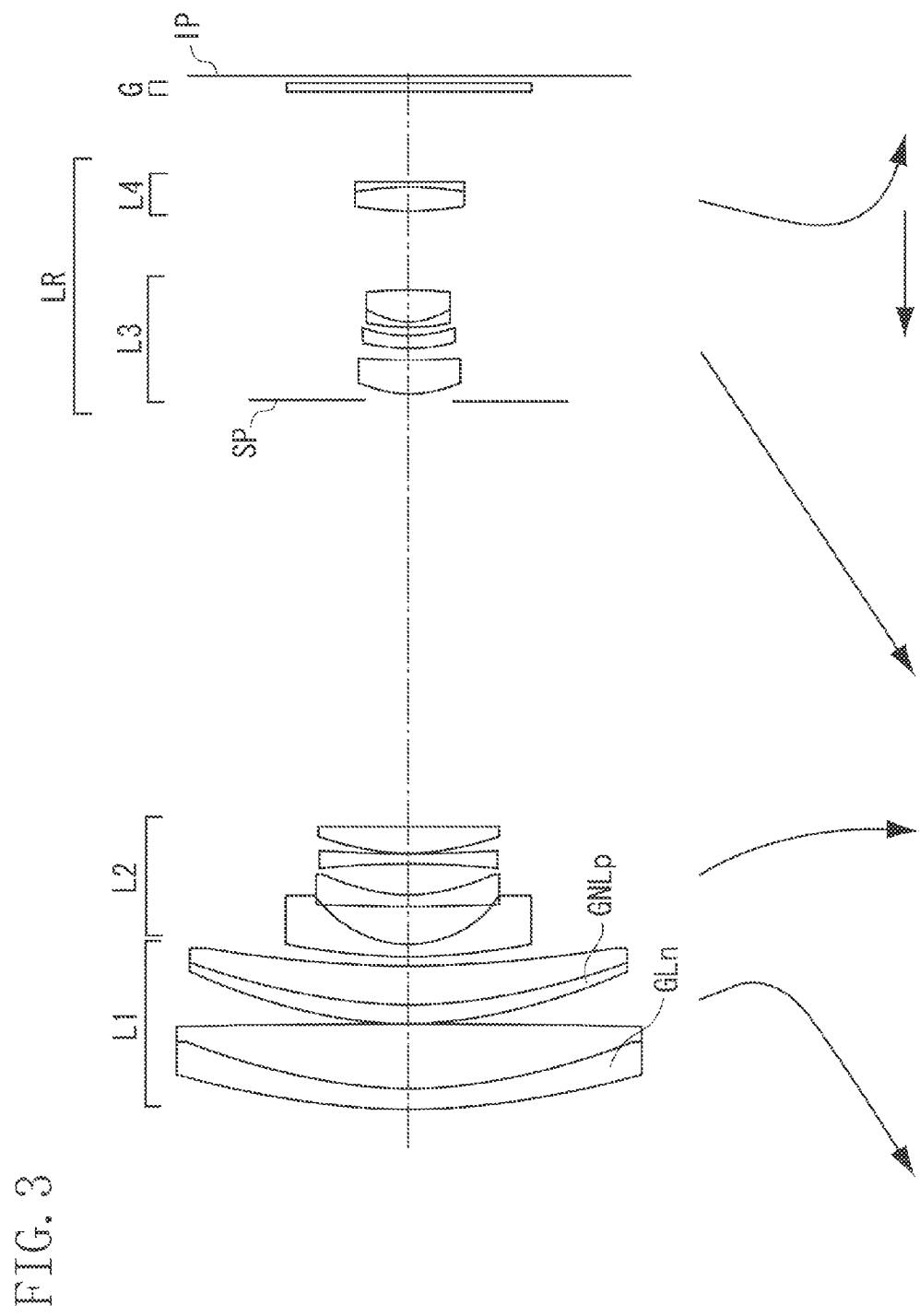
FIG. 3 is a lens cross section of a zoom lens according to a second exemplary embodiment of the present invention at the wide-angle end.

FIG. 3 is a lens cross section of a zoom lens according to a second exemplary embodiment of the present invention at the wide-angle end. FIGS. 4A through 4C are aberration charts of the zoom lens according to the second exemplary embodiment at the wide-angle end, at the middle focal length, and at the telephoto end, respectively.

Figure 5:
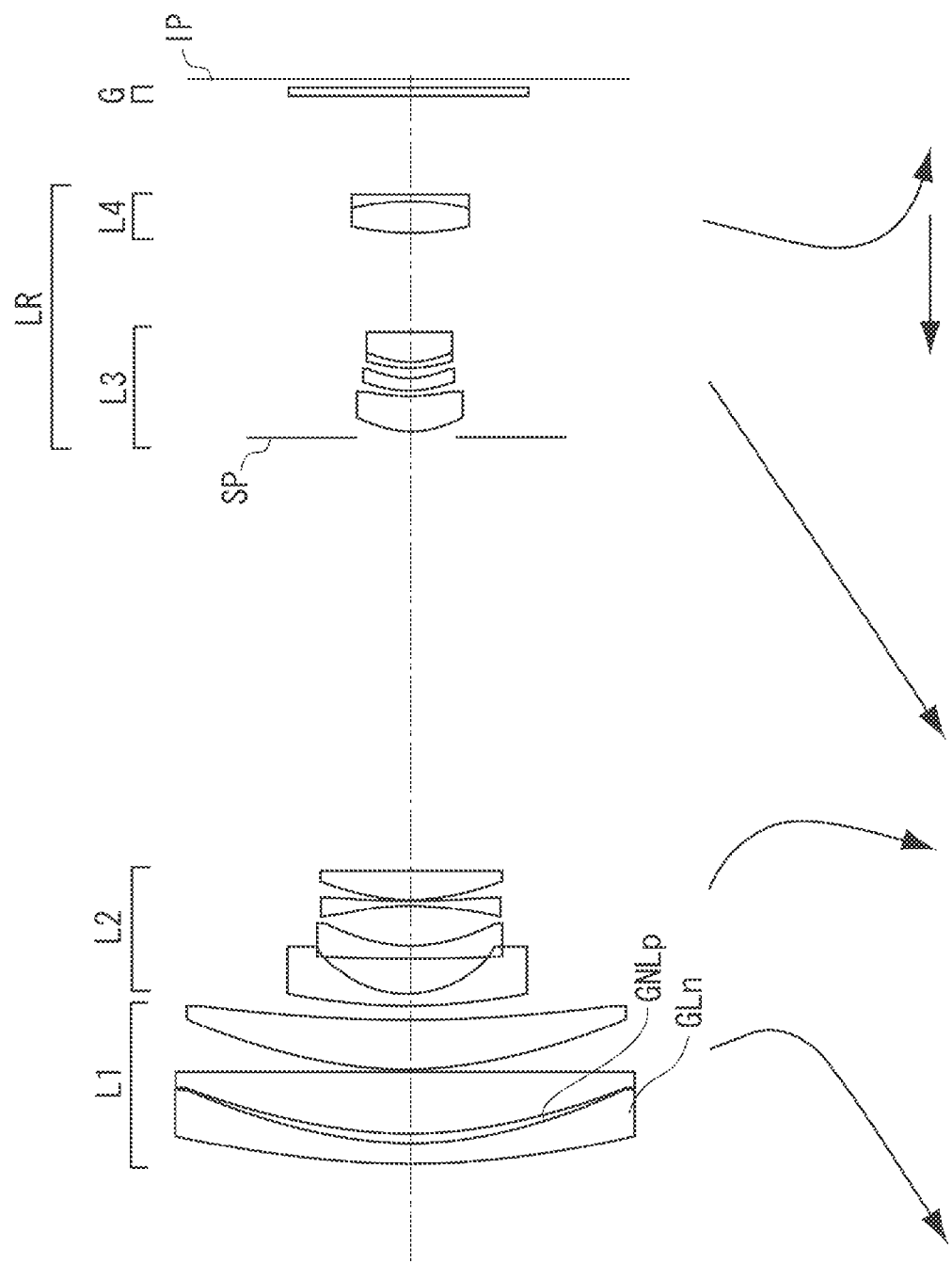
FIG. 5 is a lens cross section of a zoom lens according to a third exemplary embodiment of the present invention at the wide-angle end.

FIG. 5 is a lens cross section of a zoom lens according to a third exemplary embodiment of the present invention at the wide-angle end. FIGS. 6A through 6C are aberration charts of the zoom lens according to the third exemplary embodiment at the wide-angle end, at the middle focal length, and at the telephoto end, respectively.

Figure 7:
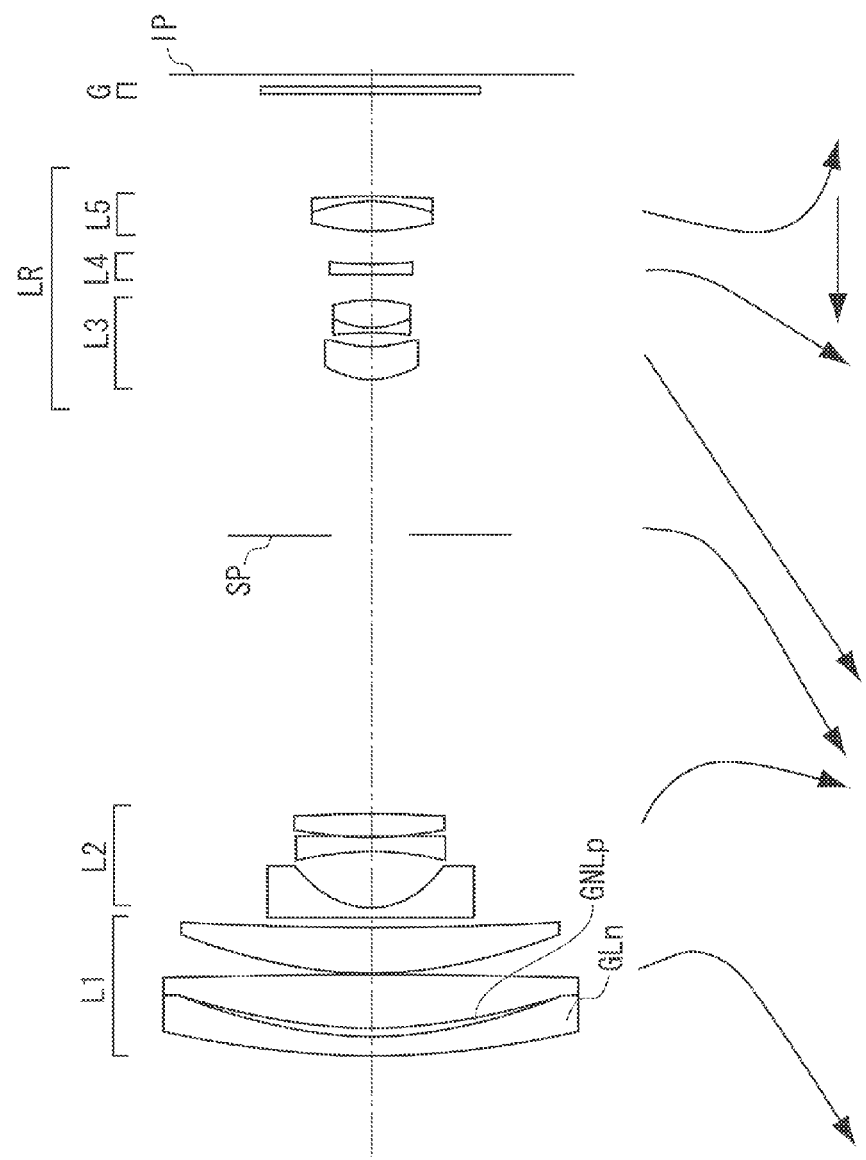
FIG. 7 is a lens cross section of a zoom lens according to a fourth exemplary embodiment of the present invention at the wide-angle end.

FIG. 7 is a lens cross section of a zoom lens according to a fourth exemplary embodiment of the present invention at the wide-angle end. FIGS. 8A through 8C are aberration charts of the zoom lens according to the fourth exemplary embodiment at the wide-angle end, at the middle focal length, and at the telephoto end, respectively.

Figure 9:
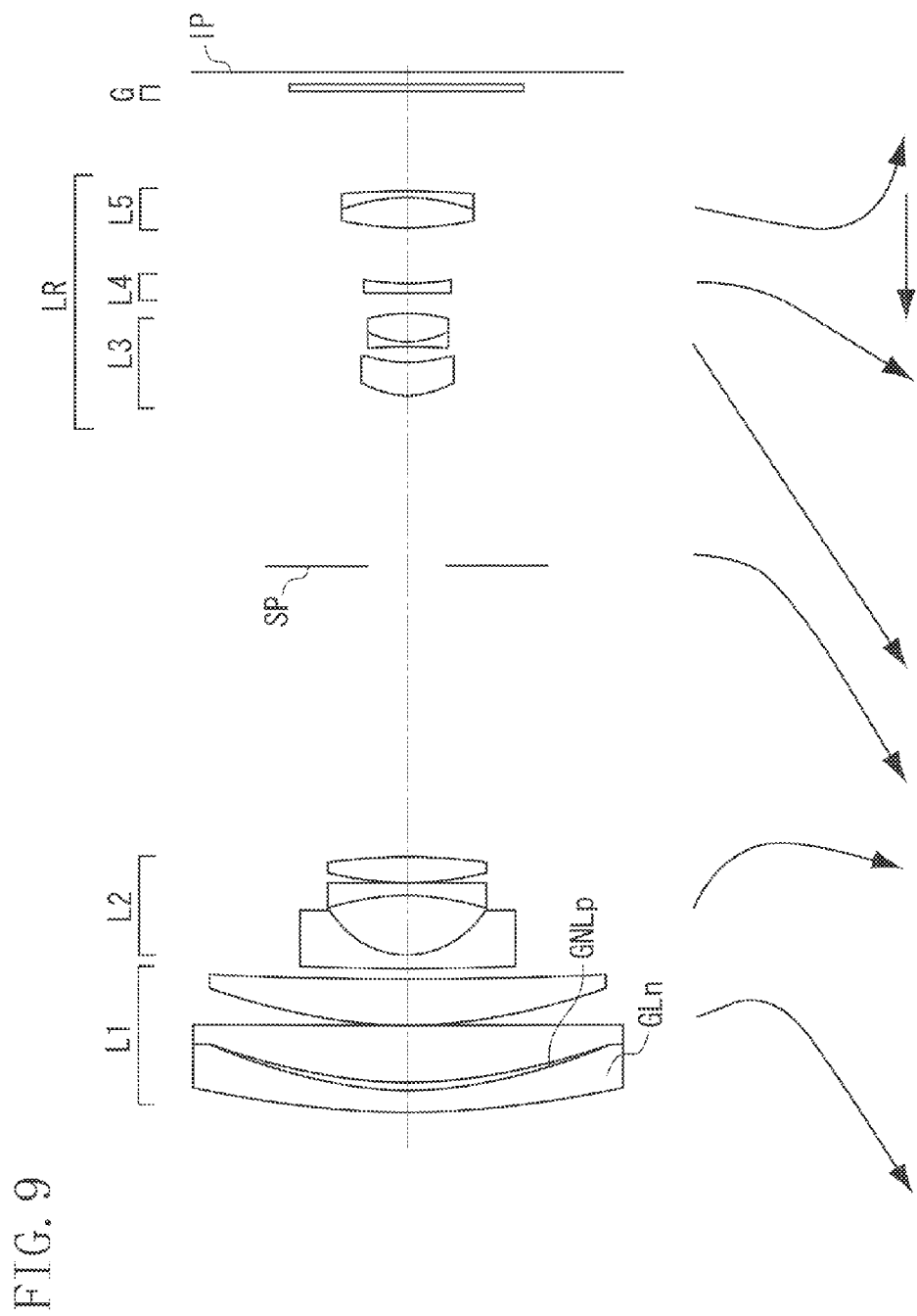
FIG. 9 is a lens cross section of a zoom lens according to a fifth exemplary embodiment of the present invention at the wide-angle end.
Figure 10A:
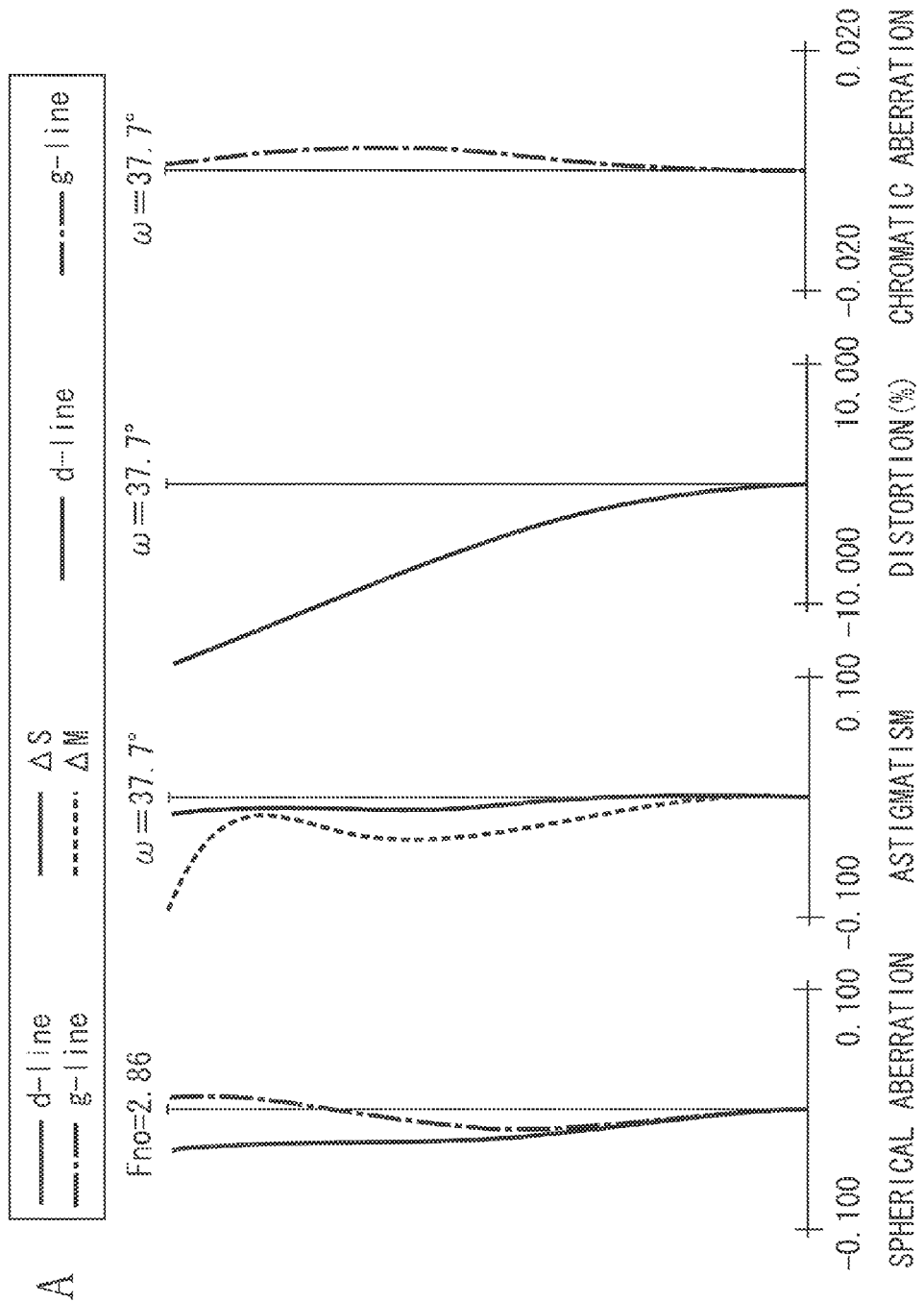
Figure 11:
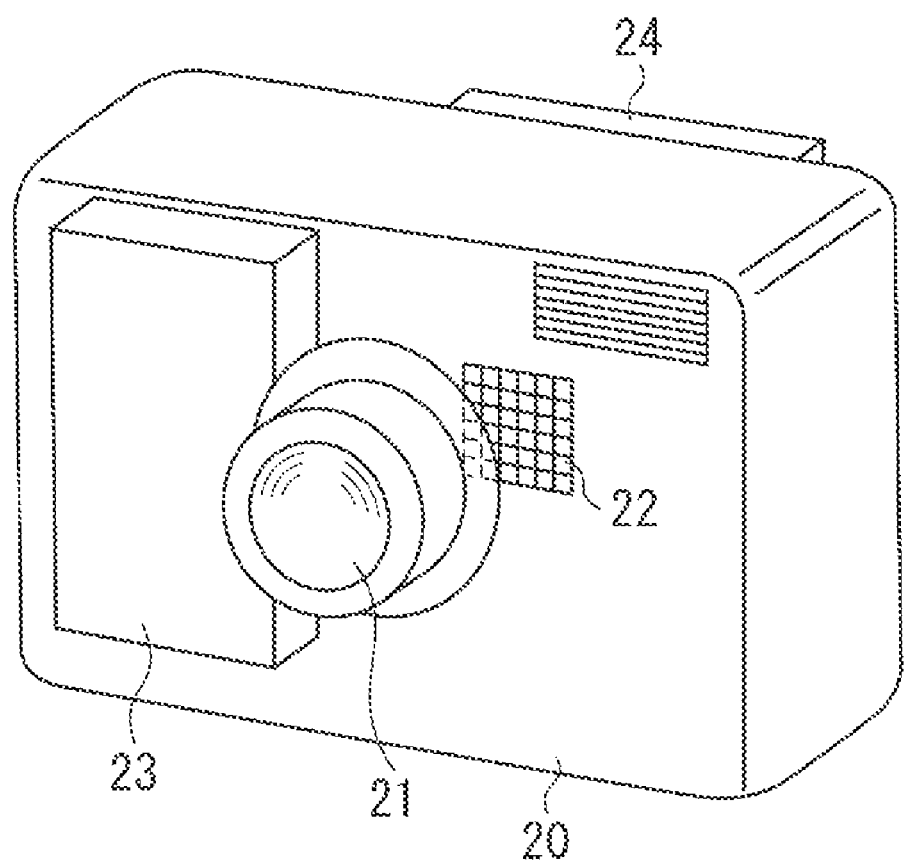
FIG. 11 illustrates main components of an image pickup apparatus according to an exemplary embodiment of the present invention.

FIG. 9 is a lens cross section of a zoom lens according to a fifth exemplary embodiment of the present invention at the wide-angle end. FIGS. 10A through 10C are aberration charts of the zoom lens according to the fifth exemplary embodiment at the wide-angle end, at the middle focal length, and at the telephoto end, respectively. FIG. 11 illustrates main components of a camera (image pickup apparatus) including the zoom lens according to an exemplary embodiment of the present invention.

The zoom lens according to each exemplary embodiment is a photographic lens system used for an image pickup apparatus, such as a video camera, a digital camera, or a silver-halide film camera. The zoom lens according to each exemplary embodiment can be used as a projection optical system for a projection apparatus (projector).

In each of the diagrams showing a cross section of the zoom lens (FIGS. 1, 3, 5, 7, and 9), an object side (front side) is shown at the left-hand portion of the drawing, and an image side (rear side) is shown at the right-hand portion thereof. In each of the diagrams showing a cross section of a photographic lens (FIGS. 1, 3, 5, 7, and 9), "i" (i=1, 2, 3 . . . ) denotes the order of a lens unit counted from the object side, "Li" denotes the i-th lens unit. "LR" denotes a subsequent lens unit including at least two lens units. "SP" denotes an aperture stop. "G" denotes an optical block, such as an optical filter, a faceplate, a low-pass filter, or an infrared-ray cut filter.

"IP" denotes an image plane. The image plane IP is, when the zoom lens according to an exemplary embodiment of the present invention is used as a photographic optical system of a video camera or a digital camera, equivalent to an imaging plane of a solid-state image sensor (photoelectric conversion element), such as a charge-coupled device (CCD) sensor or a complementary metal-oxide semiconductor (CMOS) sensor. The image plane IP is, when the optical system is used as a photographic optical system of a silver-halide film camera, equivalent to a film (photosensitive) surface.

In each of the diagrams showing a cross section of the zoom lens (FIGS. 1, 3, 5, 7, and 9), an arrow indicates a moving locus along which each lens unit moves during zooming (variable magnification) from the wide-angle end to the telephoto end or indicates the direction of movement for each lens unit during focusing from an infinitely-distant object to a short-distance object.

In each of the aberration charts (FIGS. 2A through 2C, 4A through 4C, 6A through 6C, 8A through 8C, and 10A through 10C), "d" and "g" respectively denote d-line light and g-line light. "ΔM" and "ΔS" respectively denote a meridional image plane and a sagittal image plane. Chromatic aberration of magnification is represented with respect to g-line light. "ω" denotes a half angle of view, and "Fno" denotes an F-number. In each of the following exemplary embodiments, each of the wide-angle end and the telephoto end refers to a zooming position where a lens unit for variable magnification (the third lens unit L3) is positioned. That is, the wide-angle end and the telephoto end respectively refer to each of the ends of a range in which the magnification varying lens unit can mechanically move along an optical axis.

The zoom lens according to each exemplary embodiment includes, in order from the object side to the image side, a first lens unit L1 having a having a positive refractive power, a second lens unit L2 having a negative refractive power, and a subsequent lens unit LR. During variable magnification, the interval between the first lens unit L1 and the second lens unit L2 and the interval between the second lens unit L2 and the subsequent lens unit LR vary.

In the first through the third exemplary embodiments, the subsequent lens unit LR includes, in order from the object side to the image side, a third lens unit L3 having a positive refractive power and a fourth lens unit L4 having a positive refractive power. In the fourth and the fifth exemplary embodiments, the subsequent lens unit LR includes a third lens unit L3 having a positive refractive power, a fourth lens unit L4 having a negative refractive power, and a fifth lens unit L5 having a positive refractive power. In the zoom lens according to an exemplary embodiment of the present invention, an arbitrary number of lens units can be used to constitute the subsequent lens unit LR. More specifically, the subsequent lens unit LR can include at least two lens units.

In each exemplary embodiment, the first lens unit L1 includes a negative lens and a positive lens. A deviation, from a standard line, of a material of a negative lens GLn, whose relative partial dispersion of a material (θgF) is the lowest of the relative partial dispersions of materials of other lenses included in the first lens unit L1 (ΔθgF1n), an Abbe number of the material of the negative lens GLn (ν1n), a focal length of the negative lens GLn (f1n), a deviation, from a standard line, of a material of a positive lens GNLp, whose relative partial dispersion of a material (θgF) is the highest of the relative partial dispersions of materials of other lenses included in the first lens unit L1 (ΔθgF1p), an Abbe number of the material of the positive lens GNLp (ν1p), a focal length of the positive lens GNLp (f1p), and a focal length of the entire zoom lens at the telephoto end (ft) satisfy the following conditions:

$$-4.5 < (ft/f1n) \times (\Delta\theta F1n/\nu 1n) \times 10^4 < 6.0 \quad (1)$$

$$5.0 < \nu 1n < 27.0 \quad (2)$$

$$5.5 < (ft/f1p) \times (\Delta\theta F1p/\nu 1p) \times 10^4 < 25.0 \quad (3).$$

The Abbe number (νd) and the relative partial dispersion (θgF) are defined by the following expressions:

$$\nu d = (Nd-1)/(NF-NC)$$

$$\theta gF = (Ng-NF)/(NF-NC)$$

where "Ng" denotes the refractive index with respect to g-line light (wavelength: 435.8 nm), "NF" denotes the refractive index with respect to F-line light (wavelength: 486.1 nm), "Nd" denotes the refractive index with respect to d-line light (wavelength: 587.6 nm), and "NC" denotes the refractive index with respect to C-line light (wavelength: 656.3 nm).

The deviation, from the standard line, of the relative partial dispersion (θgF) (extraordinary partial dispersion) (ΔθgF) can be calculated by the following expression:

$$\Delta\theta gF = \theta gF - (-1.682 \times 10^{-3} \times \nu d + 0.6438).$$

The technical significance of each of the conditions (1) through (3) will be described in detail below. The condition (1) provides a condition for an amount of contribution of the negative lens GLn to the correction of the secondary spectrum, compared with a material whose relative partial dispersion θgF is on the standard line. The condition (2) provides a condition for an Abbe number of the material of the negative lens GLn. The condition (3) provides a condition for an amount of contribution of the positive lens GNLp to the correction of the secondary spectrum, compared with the material whose relative partial dispersion θgF is on the standard line. Each exemplary embodiment can effectively correct axial chromatic aberration and chromatic aberration of magnification, which may occur mainly at the telephoto end.

If the upper limit of the condition (1) is exceeded, then the secondary spectrum within the first lens unit L1 may be overcorrected or the refractive power of the negative lens GLn may become very great. In this case, monochromatic aberrations, such as spherical aberration or coma, may be overcorrected. On the other hand, if the lower limit of the condition (1) is exceeded, then a very large amount of secondary spectrum may occur on the negative lens GLn. In this case, the effect of correcting the secondary spectrum by the positive lens GNLp, which satisfies the condition (3), may be adversely set off.

If the upper limit of the condition (2) is exceeded, then primary chromatic aberration, which should be appropriately corrected in a combined correction effect with the material that satisfies the condition (3), may become undercorrected. On the other hand, if the lower limit of the condition (2) is exceeded, then the dispersion of the material may become very high. In this case, the primary chromatic aberration may be overcorrected.

If the upper limit of the condition (3) is exceeded, then the secondary spectrum within the first lens unit L1 may be overcorrected or the refractive power of the positive lens GNLp may become very great. In this case, the primary chromatic aberration, which should be appropriately corrected in a combined correction effect with the negative lens GLn, may become undercorrected. On the other hand, if the lower limit of the condition (3) is exceeded, then the secondary spectrum within the first lens unit L1 may become undercorrected.

As a material of the lens that can satisfy the conditions (1) and (2), a new type high-dispersion glass having an anomalous partial dispersion and whose relative partial dispersion $\theta gF$ is lower than that of a conventional high-dispersion glass, a potassium tantalate single crystal (KTaO3 (KT) crystal), or a ceramic material can be used. As a material of the lens that can satisfy the condition (3), an ultraviolet (UV) cured resin, polyvinyl carbazole (PVCz), or a titanium dioxide ($TiO_2$) fine particle-dispersed material can be used.

In each exemplary embodiment, it is further useful if the ranges of the values in the conditions (1) through (3) are altered as follows:

$$-4.0<(ft/f1n)\times(\Delta\theta gF1n/v1n)\times10^4<5.0 \quad (1a)$$

$$10.0<v1n<27.0 \quad (2a)$$

$$6.0<(ft/f1p)\times(\Delta\theta gF1p/v1p)\times10^4<20.0 \quad (3a)$$

In each exemplary embodiment, it is yet further useful if the ranges of the values in the conditions (1a) through (3a) are altered as follows:

$$-3.0<(ft/f1n)\times(\Delta\theta gF1n/v1n)\times10^4<4.0 \quad (1b)$$

$$15.0<v1n<27.0 \quad (2b)$$

$$6.5<(ft/f1p)\times(\Delta\theta gF1p/v1p)\times10^4<15.0 \quad (3b)$$

As described above, each exemplary embodiment appropriately sets the anomalous partial dispersion of the material of the negative lens GLn and the positive lens GNLp included in the first lens unit L1 having a positive refractive power, which constitutes the zoom lens. Accordingly, each exemplary embodiment can effectively correct axial chromatic aberration and chromatic aberration of magnification at the telephoto end with a high zoom ratio. As a result, each exemplary embodiment can achieve a high optical performance for the entire zoom area.

In each exemplary embodiment, it is yet still further useful if at least one of the following conditions is satisfied. When a relative partial dispersion of the material of the negative lens GLn included in the first lens unit L1 is denoted by $\theta gF1n$), focal lengths of the first lens unit L1 and the second lens unit L2 are denoted by f1 and f2, respectively, a focal length of the entire zoom lens at the wide-angle end is denoted by fw, imaging magnifications of the second lens unit L2 at the wide-angle end and at the telephoto end during focusing on an infinitely-distant object are denoted by $\beta 2w$ and $\beta 2t$, respectively, the zoom lens can satisfy the following conditions:

$$5.0<v1p<30.0 \quad (4)$$

$$-1.68\times10^{-3}\times v1n+0.59<\theta gF1n<3.15\times10^{-4}\times v1n^2- \\ 1.86\times10^{-2}\times v1n+0.87 \quad (5)$$

$$1.00<f1/\sqrt{(fw\times ft)}<5.00 \quad (6)$$

$$0.10<|f2|/\sqrt{(fw\times ft)}<0.80 \quad (7)$$

$$0.1<(\beta 2t/\beta 2w)/(ft/fw)<0.4 \quad (8).$$

The technical significance of each of the conditions (4) through (8) will be described in detail below. The condition (4) provides a condition for the Abbe number $v1p$ of the material of the positive lens GNLp included in the first lens unit L1.

If the upper limit of the condition (4) is exceeded, then the dispersion of the material may become too low. Accordingly, it may become necessary to assign a very high refractive power to the positive lens GNLp to correct the secondary spectrum. As a result, the thickness of the positive lens GNLp may become very great. On the other hand, if the lower limit of the condition (4) is exceeded, then the dispersion of the material may become too high. As a result, it may become difficult to correct primary chromatic aberration within the first lens unit L1, which should be corrected in a combined effect with the negative lens GLn.

The condition (5) provides a condition for the relative partial dispersion of the material of the negative lens GLn. If the upper limit of the condition (5) is exceeded, then the effect of the positive lens GNLp, which satisfies the condition (3), for correcting the secondary spectrum may be adversely set off. On the other hand, if the lower limit of the condition (5) is exceeded, then the relative partial dispersion of the material may become very low. Accordingly, if the negative lens GLn satisfying the range of the value provided by the condition (1) is used in this case, the secondary spectrum within the first lens unit L1 may be overcorrected.

The condition (6) provides a condition for the refractive power of the first positive lens unit L1. If the upper limit of the condition (6) is exceeded, then the refractive power of the first positive lens unit L1 becomes very low. As a result, the total size of the zoom lens may become too large. On the other hand, if the lower limit of the condition (6) is exceeded, then the refractive power of the first positive lens unit L1 becomes very high. Accordingly, the amount of axial chromatic aberration may increase and the amount of monochromatic aberration, such as spherical aberration or coma, may also increase at the telephoto end. As a result, it may become difficult to correct those aberrations.

The condition (7) provides a condition for the negative refractive power assigned to the second lens unit L2. If the upper limit of the condition (7) is exceeded, then the negative refractive power of the second lens unit L2 becomes very low. As a result, the total size of the zoom lens may become too large. On the other hand, if the lower limit of the condition (7) is exceeded, then the refractive power of the second lens unit L2 becomes very high. Accordingly, the amount of variation of chromatic aberration and curvature of field that may occur during zooming may increase. As a result, it may become difficult to correct those aberrations.

The condition (8) provides a condition for the performance of variable magnification by the second lens unit L2. For a zoom lens having a high zoom ratio, various aberrations can be effectively corrected for the entire zoom area by assigning the performance of variable magnification dividedly to a multiple of lens units. By setting the performance of variable magnification to the second lens unit L2 within the range of value of the condition (8), each exemplary embodiment can easily and effectively correct various aberrations, such as chromatic aberration, with a high zoom ratio while preventing the total size of the zoom lens system from becoming large.

In each exemplary embodiment, the first lens unit L1 can include three positive lenses. More specifically, the first lens unit L1 can include, in order from the object side to the image side, a negative lens of meniscus shape having a concave surface facing the image side and three positive lenses each having a convex surface facing the object side. With the above-described configuration, each exemplary embodiment can easily and effectively correct chromatic aberration at the telephoto end while achieving a small-size zoom lens system.

In each exemplary embodiment, it is further useful if the ranges of the values in the conditions (4) and (6) through (8) are altered as follows:

$$8.0 < v1p < 28.0 \quad (4a)$$

$$2.00 < f1/\sqrt{(fw \times ft)} < 4.00 \quad (6a)$$

$$0.20 < |f2|/\sqrt{(fw \times ft)} < 0.60 \quad (7a)$$

$$0.15 < (\beta 2t/\beta 2w)/(ft/fw) < 0.4 \quad (8a).$$

In each exemplary embodiment, it is further useful if the ranges of the values in the conditions (4a) and (6a) through (8a) are altered as follows:

$$10.0 < v1p < 26.0 \quad (4b)$$

$$2.50 < f1/\sqrt{(fw \times ft)} < 3.50 \quad (6b)$$

$$0.30 < |f2|/\sqrt{(fw \times ft)} < 0.50 \quad (7b)$$

$$0.20 < (\beta 2t/\beta 2w)/(ft/fw) < 0.40 \quad (8b).$$

As described above, each exemplary embodiment can achieve a zoom lens capable of effectively correcting chromatic aberration at the telephoto end and having a high optical performance for the entire zoom area.

An exemplary lens configuration of each embodiment will be described in detail below. In the zoom lens according to the first exemplary embodiment illustrated in FIG. 1, during zooming from the wide-angle end to the telephoto end, the first lens unit L1 and the third lens unit L3 move towards the object side, while the second lens unit L2 moves along a locus convex towards the image side, as indicated by the respective arrows in FIG. 1. In addition, the fourth lens unit L4 moves along a locus convex towards the object side to compensate for variation on the image plane that may occur due to variable magnification. The aperture stop SP moves integrally with the third lens unit L3.

For focusing from an infinitely-distant object to a short-distance object, the present exemplary embodiment employs a rear focusing method. More specifically, the fourth lens unit L4 moves towards the object side along the optical axis for focusing from an infinitely-distant object to a short-distance object. In each exemplary embodiment, the fourth lens unit L4, whose weight is light, is used as a focusing lens unit. Accordingly, each exemplary embodiment can execute quick focusing.

Now, an exemplary lens configuration of each lens unit will be described in detail below. The lens configuration will be described in order from the object side to the image side.

The first lens unit L1 includes, in order from the object side to the image side, a negative lens of meniscus shape having a concave surface facing the image side and three positive lenses each having a convex surface facing the object side. More specifically, the first lens unit L1 includes a cemented lens including three positive lenses cemented together, e.g., a negative lens GLn of meniscus shape having a concave surface facing the image side, a positive lens GNLp of meniscus shape having a convex surface facing the object side, and a positive lens having a convex surface facing the object side. The first lens unit L1 further includes a positive lens of meniscus shape having a convex surface facing the object side.

The first lens unit L1 includes the above-described four lenses. With the above-described lens configuration, the present exemplary embodiment can effectively correct chromatic aberration at the telephoto end while achieving a small-size zoom lens system.

The second lens unit L2 includes two negative lenses of meniscus shape each having a concave surface facing the image side, a negative lens having a concave surface facing the object side, and a positive lens. The third lens unit L3 includes an aperture stop SP, a positive lens whose surface on the object side has an aspheric shape, a negative lens having a concave surface facing the image side, and a cemented lens including a negative lens and a positive lens. The fourth lens unit L4 includes a cemented lens including a positive lens whose surface on the object side has an aspheric shape and a negative lens.

The zoom lens according to the second exemplary embodiment will be described in detail below with reference to FIG. 3. The zoom type of the zoom lens according to the present exemplary embodiment illustrated in FIG. 3 is the same as that of the zoom lens according to the first exemplary embodiment illustrated in FIG. 1. The present exemplary embodiment is different from the first exemplary embodiment in the lens configuration of the first lens unit L1.

In the present exemplary embodiment, the first lens unit L1 includes a cemented lens including a negative lens GLn of meniscus shape having a concave surface facing the image side and a positive lens having a convex shape facing the object side and another cemented lens including a positive lens GNLp of meniscus shape having a convex surface facing the object side and a positive lens having a convex shape facing the object side.

With the above-described configuration, the present exemplary embodiment can effectively correct chromatic aberration at the telephoto end while achieving a small-size zoom lens system. The lens configuration of each of the second lens unit L2, the third lens unit L3, and the fourth lens unit L4 and the focusing method are similar to those of the first exemplary embodiment described above.

The zoom lens according to the third exemplary embodiment will be described in detail below with reference to FIG. 5. The zoom type, the lens configuration, and the focusing method of the zoom lens according to the present exemplary embodiment illustrated in FIG. 5 are the same as those of the first exemplary embodiment illustrated in FIG. 1. More specifically, the present exemplary embodiment is the same as the first exemplary embodiment except that the zoom ratio of the zoom lens according to the present exemplary embodiment is higher than that of the first exemplary embodiment.

The zoom lens according to the fourth exemplary embodiment will be described in detail below with reference to FIG. 7. In the zoom lens according to the present exemplary embodiment illustrated in FIG. 7, during zooming from the wide-angle end to the telephoto end, the first lens unit L1 and the second lens unit L2 move towards the image side along a locus convex towards the image side, as indicated by the respective arrows in FIG. 7.

In addition, during zooming from the wide-angle end to the telephoto end, the aperture stop SP, the third lens unit L3, and the fourth lens unit L4 move towards the object side. The fifth lens unit L5 moves along a locus convex towards the object side to compensate for the variation on the image plane that may occur due to variable magnification.

For focusing from an infinitely-distant object to a short-distance object, the present exemplary embodiment employs a rear focusing method. More specifically, the fifth lens unit L5 moves towards the object side along the optical axis for focusing from an infinitely-distant object to a short-distance object. In the present exemplary embodiment, the fifth lens unit L5, whose weight is light, is used as a focusing lens unit. Accordingly, the present exemplary embodiment can easily execute quick focusing.

The first lens unit L1 includes a cemented lens including a negative lens GLn of meniscus shape having a concave surface facing the image side, a positive lens GNLp of meniscus shape having a convex surface facing the object side, and a positive lens having a convex shape facing the object side. The first lens unit L1 further includes a positive lens of meniscus shape having a convex surface facing the object side.

In other words, the first lens unit L1 includes the above-described four lenses. With the lens configuration described above, the present exemplary embodiment can effectively correct chromatic aberration at the telephoto end while achieving a small-size zoom lens system.

The second lens unit L2 includes a negative lens of meniscus shape having a concave surface facing the image side, a negative lens having a concave surface facing the object side whose surface on the image side has an aspheric shape, and a positive lens. The aperture stop SP moves independently from the lens units during zooming.

The third lens unit L3 includes a positive lens both of whose surfaces have an aspheric shape and a cemented lens including a negative lens and a positive lens. The fourth lens unit L4 includes one negative lens. The fifth lens unit L5 includes a cemented lens including a positive lens and a negative lens.

The zoom lens according to the fifth exemplary embodiment will be described in detail below with reference to FIG. 9. The zoom type, the lens configuration, and the focusing method of the zoom lens according to the present exemplary embodiment illustrated in FIG. 9 are the same as those of the fourth exemplary embodiment illustrated in FIG. 7. More specifically, the present exemplary embodiment is the same as the fourth exemplary embodiment except for the material of the lens used in the present exemplary embodiment.

Exemplary embodiments of the present invention can have the above-described configuration. However, the present invention is not limited to the embodiments described above. More specifically, the exemplary embodiments of the present invention can be altered or modified in various manners within the scope of the present invention.

Numerical examples 1 through 5, which respectively correspond to the first through the fifth exemplary embodiments of the present invention, are set forth below. In each of the numerical examples 1 through 5, "i" (i=1, 2, 3 . . . ) denotes the order of a surface counted from the object side, "Ri" denotes a radius of curvature of an i-th optical surface (the i-th lens surface), "Di" denotes an axial interval between the i-th surface and the (i+1)-th surface, "ndi" and "vdi" respectively denote a refractive index and an Abbe number of the material of the i-th optical member with respect to d-line light. "f" denotes the focal length. "Fno" denotes an F-number. "ω" denotes a half angle of view, and an asterisk "*" denotes an aspheric surface. For the negative lens GLn and the positive lens GNLp used in each exemplary embodiment, the relative partial dispersion θgF of its material is also set forth.

The aspheric shape of a given aspheric surface is expressed as $$x=(h^2/R)/[1+\{1-(1+k)\times(h/R)^2\}^{1/2}]+B \cdot h^4+C \cdot h^6+D \cdot h^8+E \cdot h^{10}$$

where the direction of travel of light is taken as the positive direction, "x" denotes a displacement from a surface vertex along the optical axis in a position at a height "h" from the optical axis, and "R" denotes a paraxial radius of curvature, "k" denotes a conic constant, and each of "B", "D", "C", and "E" denotes an aspheric coefficient. The scientific notation "e±xx" for each aspheric coefficient is equivalent to the exponential notation "1×10$^{\pm XX}$". The relationship between each condition described above and each numerical example is set forth in Table 1. The refractive index, Abbe number, and relative partial dispersion of the negative lens GLn and the positive lens GNLp used in each exemplary embodiment are set forth in Table 2.

Numerical Example 1

Unit: mm

Surface Data

| Surface No. | r | d | nd | vd | Effective diameter |
|---|---|---|---|---|---|
| 1 | 83.400 | 1.85 | 1.84200 | 25.9 | 38.80 (GLn) θgF = 0.605 |
| 2 | 42.611 | 0.64 | 1.63555 | 22.7 | 36.45 (GNLp) θgF = 0.690 |
| 3 | 48.510 | 5.00 | 1.49700 | 81.5 | 36.45 |
| 4 | 2752.829 | 0.10 | | | 36.30 |
| 5 | 44.458 | 4.00 | 1.69680 | 55.5 | 35.65 |
| 6 | 152.332 | Variable | | | 35.10 |
| 7 | 46.077 | 1.20 | 1.88300 | 40.8 | 20.90 |
| 8 | 9.519 | 3.32 | | | 15.40 |
| 9 | 40.035 | 1.05 | 1.88300 | 40.8 | 15.30 |
| 10 | 16.387 | 3.26 | | | 14.40 |
| 11 | −28.040 | 0.80 | 1.77250 | 49.6 | 14.30 |
| 12 | 6103.356 | 0.10 | | | 14.60 |
| 13 | 24.399 | 2.30 | 1.92286 | 18.9 | 15.00 |
| 14 | 1114.216 | Variable | | | 14.85 |
| 15 (Stop) | ∞ | 0.55 | | | 8.00 |
| 16* | 9.290 | 3.14 | 1.80610 | 40.9 | 8.25 |
| 17 | 16.625 | 0.71 | | | 7.50 |
| 18 | 11.055 | 1.05 | 1.84666 | 23.9 | 7.35 |
| 19 | 8.556 | 0.59 | | | 6.90 |
| 20 | 16.393 | 0.50 | 2.00330 | 28.3 | 6.90 |
| 21 | 6.482 | 2.71 | 1.65844 | 50.9 | 6.65 |
| 22 | −49.021 | Variable | | | 6.60 |
| 23* | 26.889 | 2.73 | 1.67790 | 55.3 | 9.40 |
| 24 | −28.503 | 0.60 | 1.69895 | 30.1 | 9.25 |
| 25 | −15317.304 | Variable | | | 9.20 |
| 26 | ∞ | 0.75 | 1.51633 | 64.1 | 20.00 |
| 27 | ∞ | 0.50 | | | 20.00 |
| Image plane | ∞ | | | | |

-continued

Unit: mm

Aspheric Coefficients

| | | | |
|---|---|---|---|
| r16 | κ = −5.96143e−01 | B = 3.39451e−05 | C = 4.33416e−07 |
| | D = 2.09148e−09 | E = −7.03921e−12 | |
| r23 | κ = 1.06032e+01 | B = −7.45081e−05 | C = 4.32244e−07 |
| | D = −5.54578e−08 | E = 8.44883e−10 | |

| | Wide-angle end | Middle focal length | Telephoto end |
|---|---|---|---|
| f | 5.15 | 64.36 | 122.40 |
| Fno | 2.86 | 4.49 | 5.76 |
| ω | 36.99 | 3.45 | 1.82 |
| d6 | 0.98 | 44.53 | 49.59 |
| d14 | 39.76 | 3.31 | 1.20 |
| d22 | 8.04 | 17.93 | 37.16 |
| d25 | 8.40 | 17.82 | 6.86 |

Numerical Example 2

Unit: mm

Surface Data

| Surface No. | r | d | nd | νd | Effective diameter |
|---|---|---|---|---|---|
| 1 | 68.716 | 1.85 | 2.10600 | 17.1 | 38.80 (GLn) θgF = 0.607 |
| 2 | 47.945 | 5.60 | 1.48749 | 70.2 | 37.80 |
| 3 | −1077.959 | 0.10 | | | 37.60 |
| 4 | 41.838 | 1.53 | 1.89000 | 19.2 | 36.60 (GNLp) θgF = 0.662 |
| 5 | 46.404 | 3.50 | 1.69680 | 55.5 | 36.10 |
| 6 | 100.111 | Variable | | | 35.30 |
| 7 | 54.779 | 1.05 | 1.88300 | 40.8 | 20.10 |
| 8 | 9.394 | 3.47 | | | 14.95 |
| 9 | 86.358 | 1.05 | 1.88300 | 40.8 | 14.90 |
| 10 | 16.999 | 2.70 | | | 14.00 |
| 11 | −55.952 | 0.80 | 1.77250 | 49.6 | 14.05 |
| 12 | 107.507 | 0.10 | | | 14.25 |
| 13 | 21.075 | 2.30 | 1.92286 | 18.9 | 14.70 |
| 14 | 243.507 | Variable | | | 14.50 |
| 15 (Stop) | ∞ | 0.55 | | | 7.64 |
| 16* | 9.970 | 3.14 | 1.80610 | 40.9 | 8.25 |
| 17 | 48.526 | 1.00 | | | 7.70 |
| 18 | 15.186 | 1.05 | 1.84666 | 23.8 | 7.35 |
| 19 | 9.515 | 0.80 | | | 6.90 |
| 20 | 17.420 | 0.50 | 2.00330 | 28.3 | 6.85 |
| 21 | 6.258 | 2.71 | 1.65844 | 50.9 | 6.50 |
| 22 | −151.147 | Variable | | | 6.55 |
| 23* | 27.585 | 2.00 | 1.67790 | 55.3 | 8.80 |
| 24 | −31.810 | 0.60 | 1.69895 | 30.1 | 8.70 |
| 25 | −137.046 | Variable | | | 8.65 |
| 26 | ∞ | 0.75 | 1.51633 | 64.1 | 20.00 |
| 27 | ∞ | 0.50 | | | 20.00 |
| Image plane | ∞ | | | | |

Aspheric Coefficients

| | | | |
|---|---|---|---|
| r16 | κ = 2.00153e−02 | B = −6.62140e−05 | C = −4.28850e−07 |
| | D = −6.53275e−10 | E = −1.50356e−10 | |
| r23 | κ = −4.49227e−01 | B = −1.50742e−06 | C = −4.08979e−08 |
| | D = 2.08326e−08 | E = −4.58824e−10 | |

| | Wide-angle end | Middle focal length | Telephoto end |
|---|---|---|---|
| f | 5.15 | 40.28 | 102.29 |
| Fno | 2.86 | 4.22 | 4.76 |
| ω | 36.64 | 5.43 | 2.14 |
| d6 | 0.80 | 32.05 | 45.84 |
| d14 | 37.57 | 3.25 | 1.93 |
| d22 | 7.02 | 10.12 | 25.61 |
| d25 | 7.97 | 20.88 | 7.16 |

Numerical Example 3

Unit: mm

Surface Data

| Surface No. | r | d | nd | νd | Effective diameter |
|---|---|---|---|---|---|
| 1 | 82.667 | 1.85 | 1.89676 | 23.0 | 38.95 (GLn) θgF = 0.611 |
| 2 | 41.996 | 0.80 | 1.69591 | 17.7 | 37.85 (GNLp) θgF = 0.686 |
| 3 | 48.425 | 5.60 | 1.48749 | 70.2 | 37.85 |
| 4 | −3887.949 | 0.10 | | | 37.65 |
| 5 | 43.929 | 4.60 | 1.69680 | 55.5 | 37.05 |
| 6 | 162.379 | Variable | | | 36.35 |
| 7 | 45.933 | 1.20 | 1.88300 | 40.8 | 20.00 |
| 8 | 9.395 | 3.36 | | | 14.85 |
| 9 | 75.336 | 1.05 | 1.88300 | 40.8 | 14.75 |
| 10 | 15.000 | 3.23 | | | 13.75 |
| 11 | −28.519 | 0.80 | 1.77250 | 49.6 | 13.80 |
| 12 | −99.236 | 0.10 | | | 14.15 |
| 13 | 24.349 | 2.30 | 1.94595 | 18.0 | 14.65 |
| 14 | 317.987 | Variable | | | 14.50 |
| 15 (Stop) | ∞ | 0.55 | | | 8.35 |
| 16* | 9.395 | 3.14 | 1.80610 | 40.9 | 8.55 |
| 17 | 17.087 | 0.50 | | | 7.65 |
| 18 | 10.979 | 1.05 | 1.84666 | 23.9 | 7.45 |
| 19 | 8.282 | 0.80 | | | 6.90 |
| 20 | 15.851 | 0.50 | 2.00330 | 28.3 | 6.90 |
| 21 | 6.746 | 2.71 | 1.65844 | 50.9 | 6.60 |
| 22 | −61.246 | Variable | | | 6.40 |
| 23* | 26.781 | 2.73 | 1.67790 | 55.3 | 9.50 |
| 24 | −20.359 | 0.60 | 1.69895 | 30.1 | 9.40 |
| 25 | 5032.491 | Variable | | | 9.30 |
| 26 | ∞ | 0.75 | 1.51633 | 64.1 | 20.00 |
| 27 | ∞ | 0.50 | | | 20.00 |
| Image plane | ∞ | | | | |

Aspheric Coefficients

| | | | |
|---|---|---|---|
| r16 | κ = −1.09031e+00 | B = 1.08342e−04 | C = 6.99887e−07 |
| | D = −7.78486e−09 | E = 1.86703e−10 | |
| r23 | κ = −2.10152e+01 | B = 1.23185e−04 | C = −8.02678e−07 |
| | D = −2.02761e−08 | E = 5.82125e−10 | |

| | Wide-angle end | Middle focal length | Telephoto end |
|---|---|---|---|
| f | 5.15 | 64.26 | 122.40 |
| Fno | 2.86 | 4.85 | 5.76 |
| ω | 37.00 | 3.46 | 1.82 |
| d6 | 0.85 | 44.18 | 49.91 |
| d14 | 38.20 | 3.47 | 1.20 |
| d22 | 8.82 | 16.55 | 34.39 |
| d25 | 8.77 | 20.99 | 11.70 |

Numerical Example 4

Unit: mm

Surface Data

| Surface No. | r | d | nd | νd | Effective diameter |
|---|---|---|---|---|---|
| 1 | 84.755 | 1.85 | 1.88221 | 23.8 | 37.75 (GLn) θgF = 0.604 |
| 2 | 43.746 | 0.80 | 1.63555 | 22.7 | 35.25 (GNLp) θgF = 0.690 |
| 3 | 53.578 | 5.20 | 1.48749 | 70.2 | 35.25 |
| 4 | −620.564 | 0.10 | | | 35.05 |
| 5 | 45.540 | 4.20 | 1.60311 | 60.6 | 34.50 |
| 6 | 237.737 | Variable | | | 33.90 |
| 7 | 428.656 | 1.20 | 1.88300 | 40.8 | 18.25 |
| 8 | 8.280 | 5.40 | | | 13.15 |
| 9 | −25.346 | 1.20 | 1.76753 | 49.3 | 12.85 |
| 10* | 60.081 | 0.10 | | | 13.05 |
| 11 | 35.596 | 2.24 | 1.94595 | 18.0 | 13.15 |
| 12 | −74.904 | Variable | | | 13.00 |
| 13 (Stop) | ∞ | Variable | | | 7.06 |
| 14* | 8.358 | 3.14 | 1.80610 | 40.4 | 8.00 |
| 15* | 17.098 | 1.20 | | | 6.85 |
| 16 | −94.015 | 0.50 | 1.80610 | 33.3 | 6.60 |
| 17 | 6.701 | 2.71 | 1.59319 | 67.9 | 6.40 |
| 18 | −15.571 | Variable | | | 6.65 |
| 19 | −561.908 | 1.00 | 1.48749 | 70.2 | 6.90 |
| 20 | 25.495 | Variable | | | 6.95 |
| 21 | 19.454 | 2.73 | 1.58313 | 59.4 | 10.25 |
| 22 | −15.381 | 0.60 | 1.74950 | 35.3 | 10.15 |
| 23 | −43.551 | Variable | | | 10.10 |
| 24 | ∞ | 0.75 | 1.51633 | 64.1 | 20.00 |
| 25 | ∞ | 1.01 | | | 20.00 |
| Image plane | ∞ | | | | |

Aspheric Coefficients

| | | | |
|---|---|---|---|
| r10 | κ = 0.00000e+00 | B = −5.60834e−05 | C = −6.45975e−07 |
| | D = 1.57450e−08 | E = −2.55828e−10 | |
| r14 | κ = 2.77085e−01 | B = 8.94280e−05 | C = 2.72015e−06 |
| | D = −5.74588e−08 | E = 6.08182e−09 | |
| r15 | κ = −9.95845e−01 | B = 4.95565e−04 | C = 9.14231e−06 |
| | D = −1.56781e−07 | E = 2.65579e−08 | |

| | Wide-angle end | Middle focal length | Telephoto end |
|---|---|---|---|
| f | 4.42 | 42.43 | 125.66 |
| Fno | 2.86 | 4.98 | 5.94 |
| ω | 37.75 | 5.22 | 1.77 |
| d6 | 1.00 | 38.98 | 52.20 |
| d12 | 26.96 | 5.78 | 1.78 |
| d13 | 14.97 | 1.35 | 1.45 |
| d18 | 2.55 | 14.34 | 13.81 |
| d20 | 3.17 | 2.54 | 19.31 |
| d23 | 10.00 | 18.13 | 10.15 |

Numerical Example 5

Unit: mm

Surface Data

| Surface No. | r | d | nd | νd | Effective diameter |
|---|---|---|---|---|---|
| 1 | 86.733 | 1.85 | 1.84200 | 25.9 | 37.60 (GLn) θgF = 0.605 |
| 2 | 41.835 | 0.76 | 1.63555 | 22.7 | 35.85 (GNLp) θgF = 0.690 |
| 3 | 48.521 | 5.20 | 1.59201 | 67.0 | 35.85 |
| 4 | 615.211 | 0.10 | | | 35.60 |
| 5 | 47.759 | 4.20 | 1.60311 | 60.6 | 35.00 |
| 6 | 252.287 | Variable | | | 34.45 |
| 7 | 285.641 | 1.20 | 1.88300 | 40.8 | 18.75 |
| 8 | 8.293 | 5.47 | | | 13.45 |
| 9 | −25.467 | 1.20 | 1.76753 | 49.3 | 13.25 |
| 10* | 71.082 | 0.10 | | | 13.55 |
| 11 | 37.984 | 2.24 | 1.94595 | 18.0 | 13.65 |
| 12 | −74.904 | Variable | | | 13.55 |
| 13 (Stop) | ∞ | Variable | | | 6.96 |
| 14* | 8.450 | 3.14 | 1.80610 | 40.4 | 7.90 |
| 15* | 17.312 | 1.21 | | | 6.80 |
| 16 | −84.544 | 0.50 | 1.80610 | 33.3 | 6.55 |
| 17 | 7.068 | 2.71 | 1.59319 | 67.9 | 6.60 |
| 18 | −14.128 | Variable | | | 6.90 |
| 19 | −149.564 | 1.00 | 1.48749 | 70.2 | 7.30 |
| 20 | 29.184 | Variable | | | 7.40 |
| 21 | 21.935 | 2.73 | 1.58313 | 59.4 | 11.00 |
| 22 | −19.630 | 0.60 | 1.76182 | 26.5 | 10.90 |
| 23 | −44.563 | Variable | | | 10.90 |
| 24 | ∞ | 0.75 | 1.51633 | 64.1 | 20.00 |
| 25 | ∞ | 1.01 | | | 20.00 |
| Image plane | ∞ | | | | |

Aspheric Coefficients

| | | | |
|---|---|---|---|
| r10 | κ = 0.00000e+00 | B = −5.75637e−05 | C = −8.61236e−07 |
| | D = 2.12018e−08 | E = −3.06663e−10 | |
| r14 | κ = 2.52088e−01 | B = 1.12785e−04 | C = 2.67883e−06 |
| | D = −4.48413e−08 | E = 5.77698e−09 | |
| r15 | κ = 2.39425e+00 | B = 4.48714e−04 | C = 9.73615e−06 |
| | D = −2.15360e−07 | E = 2.73375e−08 | |

| | Wide-angle end | Middle focal length | Telephoto end |
|---|---|---|---|
| f | 4.42 | 42.30 | 126.50 |
| Fno | 2.86 | 4.79 | 5.86 |
| ω | 37.73 | 5.24 | 1.76 |
| d6 | 1.00 | 40.03 | 53.76 |
| d12 | 26.83 | 5.07 | 1.19 |
| d13 | 15.56 | 1.37 | 1.45 |
| d18 | 1.85 | 10.21 | 8.00 |
| d20 | 5.01 | 7.43 | 25.54 |
| d23 | 9.13 | 17.60 | 9.95 |

TABLE 1

| Condition | UL | LL | Numerical Example 1 | 2 | 3 | 4 | 5 |
|---|---|---|---|---|---|---|---|
| (1) | −4.5 | 6.0 | −2.23 | 3.19 | −3.11 | 0.10 | −2.49 |
| (2) | 5.0 | 27.0 | 25.9 | 17.1 | 23.0 | 23.8 | 25.9 |
| (3) | 5.5 | 25.0 | 8.54 | 6.52 | 11.45 | 12.76 | 10.21 |
| (4) | 5.0 | 30.0 | 22.7 | 19.2 | 17.7 | 22.7 | 22.7 |
| (5) | νd | | 25.9 | 17.1 | 23.0 | 23.8 | 25.9 |
| | θgF | | 0.605 | 0.607 | 0.611 | 0.604 | 0.605 |
| (6) | 1.00 | 5.00 | 2.98 | 3.07 | 2.94 | 3.15 | 3.23 |
| (7) | 0.10 | 0.80 | 0.42 | 0.45 | 0.39 | 0.40 | 0.41 |
| (8) | 0.10 | 0.40 | 0.27 | 0.37 | 0.30 | 0.27 | 0.28 |

Note that in Table 1, "UL" denotes the upper limit value and "LL" denotes the lower limit value.

TABLE 2

| Numerical Example | Nd | Ng | NC | NF | νd | θgF |
|---|---|---|---|---|---|---|
| GLn | | | | | | |
| 1 | 1.84200 | 1.88478 | 1.83263 | 1.86512 | 25.9 | 0.605 |
| 2 | 2.10600 | 2.19073 | 2.08679 | 2.15147 | 17.1 | 0.607 |
| 3 | 1.89676 | 1.94838 | 1.88557 | 1.92456 | 23.0 | 0.611 |
| 4 | 1.88221 | 1.93100 | 1.87151 | 1.90861 | 23.8 | 0.604 |
| 5 | 1.84200 | 1.88478 | 1.83263 | 1.86512 | 25.9 | 0.605 |
| GNLp | | | | | | |
| 1 | 1.63555 | 1.67532 | 1.62807 | 1.65604 | 22.7 | 0.689 |
| 2 | 1.89000 | 1.95436 | 1.87713 | 1.92360 | 19.2 | 0.662 |
| 3 | 1.69591 | 1.75164 | 1.68528 | 1.72465 | 17.7 | 0.686 |
| 4 | 1.63555 | 1.67532 | 1.62807 | 1.65604 | 22.7 | 0.689 |
| 5 | 1.63555 | 1.67532 | 1.62807 | 1.65604 | 22.7 | 0.689 |

An exemplary embodiment of an image pickup apparatus in the form of a digital camera that uses the zoom lens according to at least one exemplary embodiment of the present invention as a photographic optical system therefor will be described below with reference to FIG. 11.

Referring to FIG. 11, the digital still camera includes a camera body 20 and a photographic optical system 21. The photographic optical system 21 includes an optical system according to any of the first through the fifth exemplary embodiments described above.

The camera body 20 includes a solid-state image sensor (photoelectric conversion element) 22, such as a CCD sensor or a CMOS sensor, configured to optically receive an object image formed by the photographic optical system 21.

The camera body 20 also includes a recording unit 23 (e.g., a built-in or removable memory unit), which records an object image that has been received by the solid-state image sensor 22. In addition, the camera body 20 also includes a viewfinder 24, via which a user of the camera can observe an object image displayed on a display device (not illustrated). The display device includes a liquid crystal display (LCD) panel, which displays the object image formed on the image sensor 22.

By applying the zoom lens according to at least one exemplary embodiment of the present invention to an optical apparatus, such as a video camera, the present invention can implement an image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-010929 filed Jan. 21, 2010, which is hereby incorporated by reference herein in its entirety.

What is claimed is:

1. A zoom lens comprising, in order from an object side to an image side:
   a first lens unit having a positive refractive power;
   a second lens unit having a negative refractive power; and
   a subsequent lens unit including at least two lens units,
   wherein an interval between respective adjacent lens units varies for zooming,
   wherein the first lens unit includes:
      a positive lens; and
      a negative lens,
   wherein a deviation, from a standard line, of a material of a negative lens GLn, whose relative partial dispersion of a material ($\theta gF$) is the lowest of relative partial dispersions of materials of other lenses included in the first lens unit ($\Delta\theta gF1n$), an Abbe number of the material of the negative lens GLn ($\nu 1n$), a focal length of the negative lens GLn ($f1n$), a deviation, from a standard line, of a material of a positive lens GNLp, whose relative partial dispersion of a material ($\theta gF$) is the highest of relative partial dispersions of materials of other lenses included in the first lens unit ($\Delta\theta gF1p$), an Abbe number of the material of the positive lens GNLp ($\nu 1p$), a focal length of the positive lens GNLp ($f1p$), and a focal length of the entire zoom lens at a telephoto end (ft) satisfy the following conditions:

$$-4.5 < (ft/f1n) \times (\Delta\theta gF1n/\nu 1n) \times 10^4 < 6.0$$

$$5.0 < \nu 1n < 27.0$$

$$5.5 < (ft/f1p) \times (\Delta\theta gF1p/\nu 1p) \times 10^4 < 25.0.$$

2. The zoom lens according to claim 1, wherein the Abbe number of the material of the positive lens GNLp included in the first lens unit ($\nu 1p$) satisfies the following condition:

$$5.0 < \nu 1p < 30.0.$$

3. The zoom lens according to claim 1, wherein, when a relative partial dispersion of the material of the negative lens GLn included in the first lens unit is denoted by $\theta gF1n$, the zoom lens satisfies the following condition:

$$-1.68 \times 10^{-3} \times \nu 1n + 0.59 < \theta gF1n < 3.15 \times 10^{-4} \times \nu 1n^2 - 1.86 \times 10^{-2} \times \nu 1n + 0.87.$$

4. The zoom lens according to claim 1, wherein, when a focal length of the first lens unit is denoted by f1 and a focal length of the entire zoom lens at a wide-angle end is denoted by fw, the zoom lens satisfies the following condition:

$$1.00 < f1/\sqrt{(fw \times ft)} < 5.00.$$

5. The zoom lens according to claim 1, wherein, when a focal length of the second lens unit is denoted by f2 and a focal length of the entire zoom lens at a wide-angle end is denoted by fw, the zoom lens satisfies the following condition:

$$0.10 < |f2|/\sqrt{(fw \times ft)} < 0.80.$$

6. The zoom lens according to claim 1, wherein, when imaging magnifications of the second lens unit at a wide-angle end and at the telephoto end during focusing on an infinitely-distant object are denoted by $\beta 2w$ and $\beta 2t$, respectively, and a focal length of the entire zoom lens at the wide-angle end is denoted by fw, the zoom lens satisfies the following condition:

$$0.1 < (\beta 2t/\beta 2w)/(ft/fw) < 0.4.$$

7. The zoom lens according to claim 1, wherein the first lens unit includes, in order from the object side to the image side:
   a negative lens of meniscus shape having a concave surface facing the image side; and
   three positive lenses each having a convex shape facing the object side.

8. The zoom lens according to claim 1, wherein the subsequent lens unit includes, in order from the object side to the image side:
   a third lens unit having a positive refractive power; and
   a fourth lens unit having a positive refractive power.

9. The zoom lens according to claim 1, wherein the subsequent lens unit includes, in order from the object side to the image side:
   a third lens unit having a positive refractive power;
   a fourth lens unit having a negative refractive power; and
   a fifth lens unit having a positive refractive power.

10. The zoom lens according to claim 1, wherein the zoom lens is configured to form an image on a photoelectric conversion element.

11. An image pickup apparatus comprising:
   the zoom lens according to claim 1; and
   a photoelectric conversion element configured to receive an image formed by the zoom lens.

\* \* \* \* \*